(12) United States Patent
Mukai

(10) Patent No.: US 10,742,765 B2
(45) Date of Patent: Aug. 11, 2020

(54) DEVICE SYSTEM, SERVER, AND DATA PROCESSING METHOD

(71) Applicant: Kazuhiro Mukai, Kanagawa (JP)

(72) Inventor: Kazuhiro Mukai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 52 days.

(21) Appl. No.: 16/106,157

(22) Filed: Aug. 21, 2018

(65) Prior Publication Data
US 2019/0068741 A1    Feb. 28, 2019

(30) Foreign Application Priority Data

Aug. 25, 2017    (JP) .................................. 2017-162540

(51) Int. Cl.
*H04L 29/08*    (2006.01)
*H04L 29/06*    (2006.01)
*G06F 3/12*    (2006.01)

(52) U.S. Cl.
CPC ............ *H04L 67/2842* (2013.01); *G06F 3/12* (2013.01); *H04L 63/029* (2013.01); *H04L 63/0227* (2013.01); *H04L 63/0442* (2013.01); *H04L 63/06* (2013.01); *H04L 63/061* (2013.01)

(58) Field of Classification Search
CPC combination set(s) only.
See application file for complete search history.

(56) References Cited

U.S. PATENT DOCUMENTS

| 2014/0068714 | A1 | 3/2014 | Ono et al. | |
| 2015/0067819 | A1* | 3/2015 | Shribman | H04L 67/06 726/12 |
| 2018/0210686 | A1 | 7/2018 | Takigawa et al. | |

FOREIGN PATENT DOCUMENTS

| JP | 2002-175241 | 6/2002 |
| JP | 2014-052780 | 3/2014 |

* cited by examiner

*Primary Examiner* — El Hadji M Sall
(74) *Attorney, Agent, or Firm* — Harness, Dickey & Pierce, P.L.C.

(57) ABSTRACT

A device system includes a first server on a first network and a second server on a second network. The second server stores processing data transmitted from the first server in the second memory, in response to a request for processing the processing data from the electronic device, transmits the processing data to the electronic device, and stores, in the second memory, information indicating that the processing data has been processed in association with the processing data in response to reception of a notification indicating that the processing data has been processed from the electronic device. The first server determines whether the second server stores the information indicating that the processing data has been processed, and stores the information indicating that the processing data has been processed in the first memory based on a determination that the second server stores the information indicating that the processing data has been processed.

11 Claims, 22 Drawing Sheets

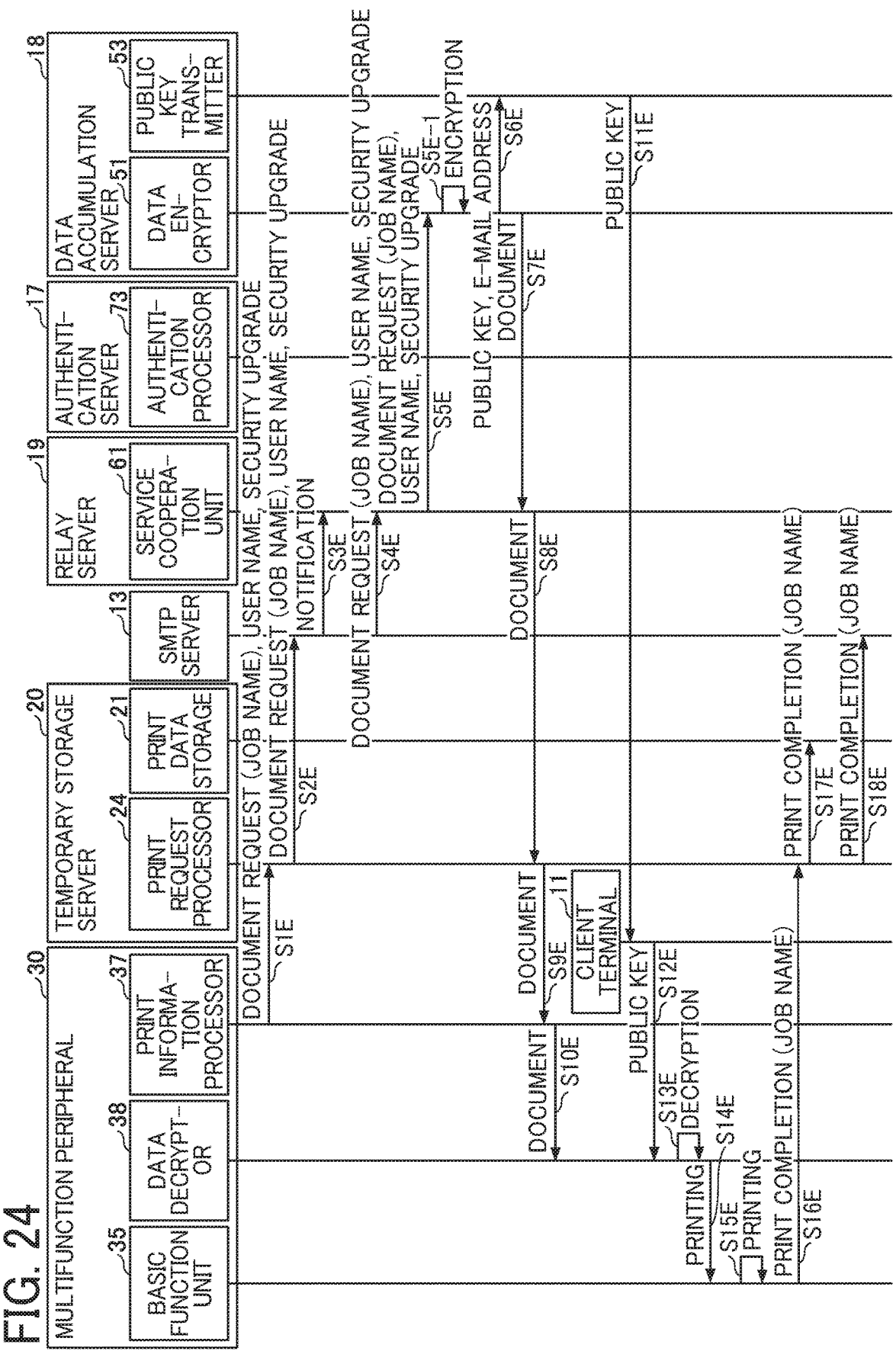

DEVICE SYSTEM, SERVER, AND DATA PROCESSING METHOD

CROSS-REFERENCE TO RELATED APPLICATIONS

This patent application is based on and claims priority pursuant to 35 U.S.C. § 119(a) to Japanese Patent Application No. 2017-162540, filed on Aug. 25, 2017, in the Japan Patent Office, the entire disclosure of which is hereby incorporated by reference herein.

BACKGROUND

Technical Field

The present invention relates to a device system, a server, and a data processing method.

Description of the Related Art

Recently, a multifunctional peripheral (MFP) is provided in, for example, a public place such as a convenience store such that any user can print a desired document using the MFP. The user may cause the MFP to read document data stored in a storage medium to print the document, or cause the MFP (or a user terminal) to download document data from a server to print the document.

However, if the server is provided on a private network, access to the server from a public network, such as from the MFP in the convenience store, is prohibited by a firewall or the like. In such case, document data is temporarily stored in a server on the public network to allow access from the MFP in the convenience store. If the same document data is stored in the server on the private network and the server on the public network, managing information indicating whether the document has been processed has been difficult.

SUMMARY

Example embodiments of the present invention include a device system provided with a first server on a first network and a second server on a second network. The second server stores processing data transmitted from the first server in the second memory, in response to a request for processing the processing data from the electronic device, transmits the processing data to the electronic device, and stores, in the second memory, information indicating that the processing data has been processed in association with the processing data in response to reception of a notification indicating that the processing data has been processed from the electronic device. The first server determines whether the second server stores the information indicating that the processing data has been processed, and stores the information indicating that the processing data has been processed in the first memory based on a determination that the second server stores the information indicating that the processing data has been processed.

Example embodiments of the present invention include the server in the device system, and a data processing method performed by the device system.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 24 is a sequence diagram illustrating a procedure in which a MFP acquires a document from a data accumulation server and prints the document, according to the third embodiment.

Figure 1:
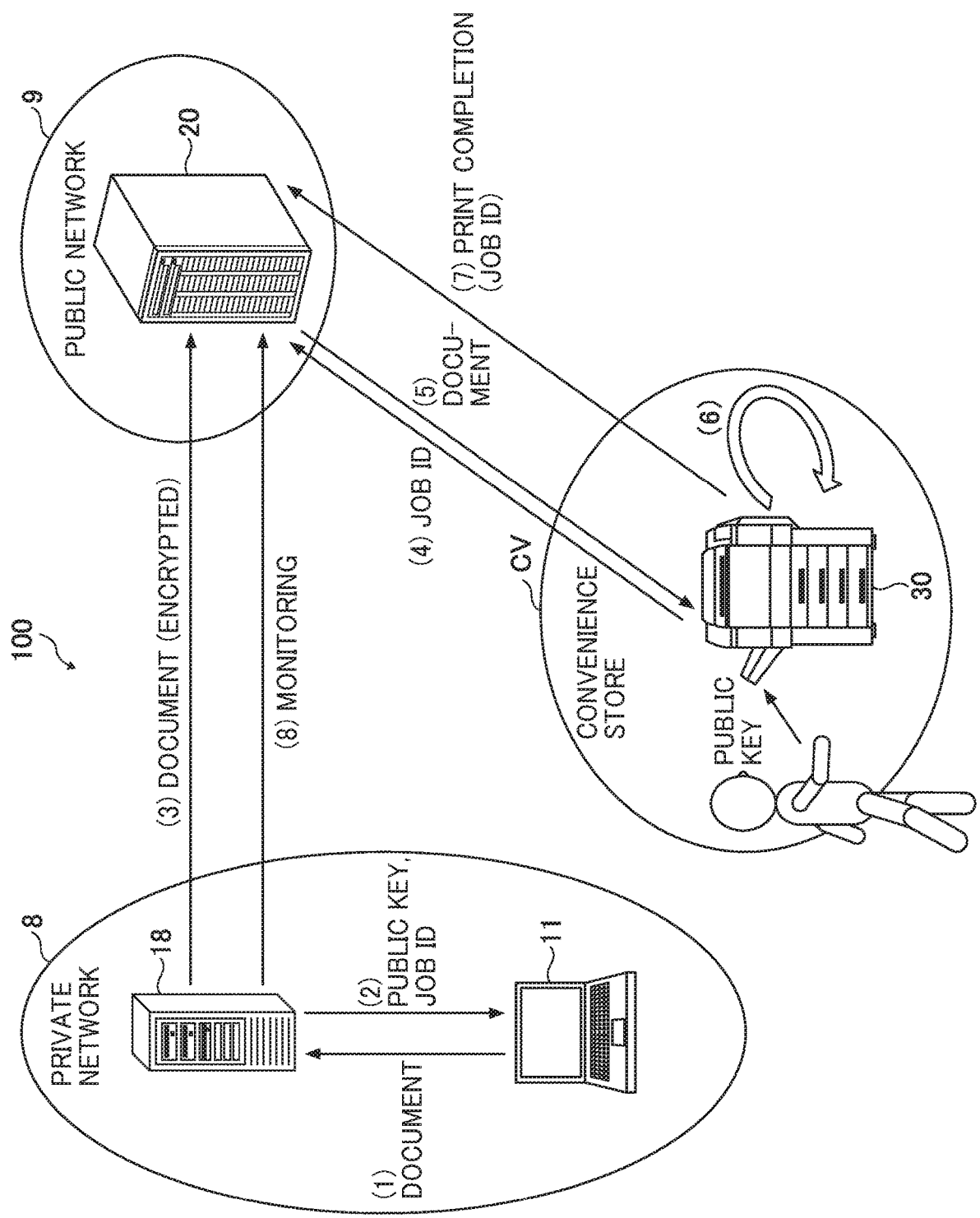
FIG. 1 is a schematic diagram for explaining operation of a device system according to one or more embodiments.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, a device system and a data processing method will be described according to embodiments.

First Embodiment

<Outline>

FIG. 1 is a schematic diagram for illustrating operation of a device system 100 according to an embodiment.

(1) A client terminal 11 registers a document to be printed in a data accumulation server 18 on a private network 8 (first network). The document in the data accumulation server 18 can be printed only within a company network (on-premise environment).

(2) Upon registration, the data accumulation server 18 provides the client terminal 11 with a public key and a job identification (ID) created in the company.

(3) The data accumulation server 18 encrypts the document with the public key and registers the encrypted document in a temporary storage server 20 on a public network 9 (second network).

(4) In the case where an employee prints the document outside the company, for example, the employee operates a MFP 30 in a convenience store CV to input the job ID and the public key. The MFP 30 transmits the job ID to the temporary storage server 20. Here, the user may be authenticated by the MFP 30.

(5) The temporary storage server 20 transmits the document specified by the job ID to the MFP 30.

(6) The MFP 30 decrypts the document with the public key and prints the document.

(7) Then, the MFP 30 transmits a notification that the document has been printed (print completion) to the temporary storage server 20.

(8) The data accumulation server 18 monitors (for example, polls) the temporary storage server 20 to detect that the document has been printed (a relay server to be described below monitors the temporary storage server 20 in the present embodiment but the data accumulation server 18 may monitor the temporary storage server 20).

With such a configuration, if a user (for example, an employee) has registered the documents accumulated in the company network to a cloud environment, the documents can also be printed in the public network such as using the MFP in the convenience store CV. Furthermore, when the temporary storage server 20 on the public network 9 is notified of print completion, the data accumulation server 18 on the private network 8 can also detect the notification of print completion. Therefore, even if the same document exists in the private network 8 and in the public network 9, the history as to whether the document has been printed can be managed.

The MFP 30 is an example of an electronic device that performs some output processing using data to be processed. The data to be processed by the electronic device is referred to as processing data. Examples of processing data include, but not limited to, a document (print data) to be printed by the MFP 30. Accordingly, the output processing to be performed by the MFP 30 is printing. That is, the processing data has been processed means that the processing data has been used for some output. Alternatively, the electronic device may be a projector or the like to be described below.

The second network refers to a network used by an unspecified person, such as a public network, for example, the Internet. The first network may just be isolated from the second network. More specifically, the first network may be a private network, such as a network where an administrator exists, a network inside a firewall, a local area network (LAN), or the like.

<System Configuration>

Figure 2:
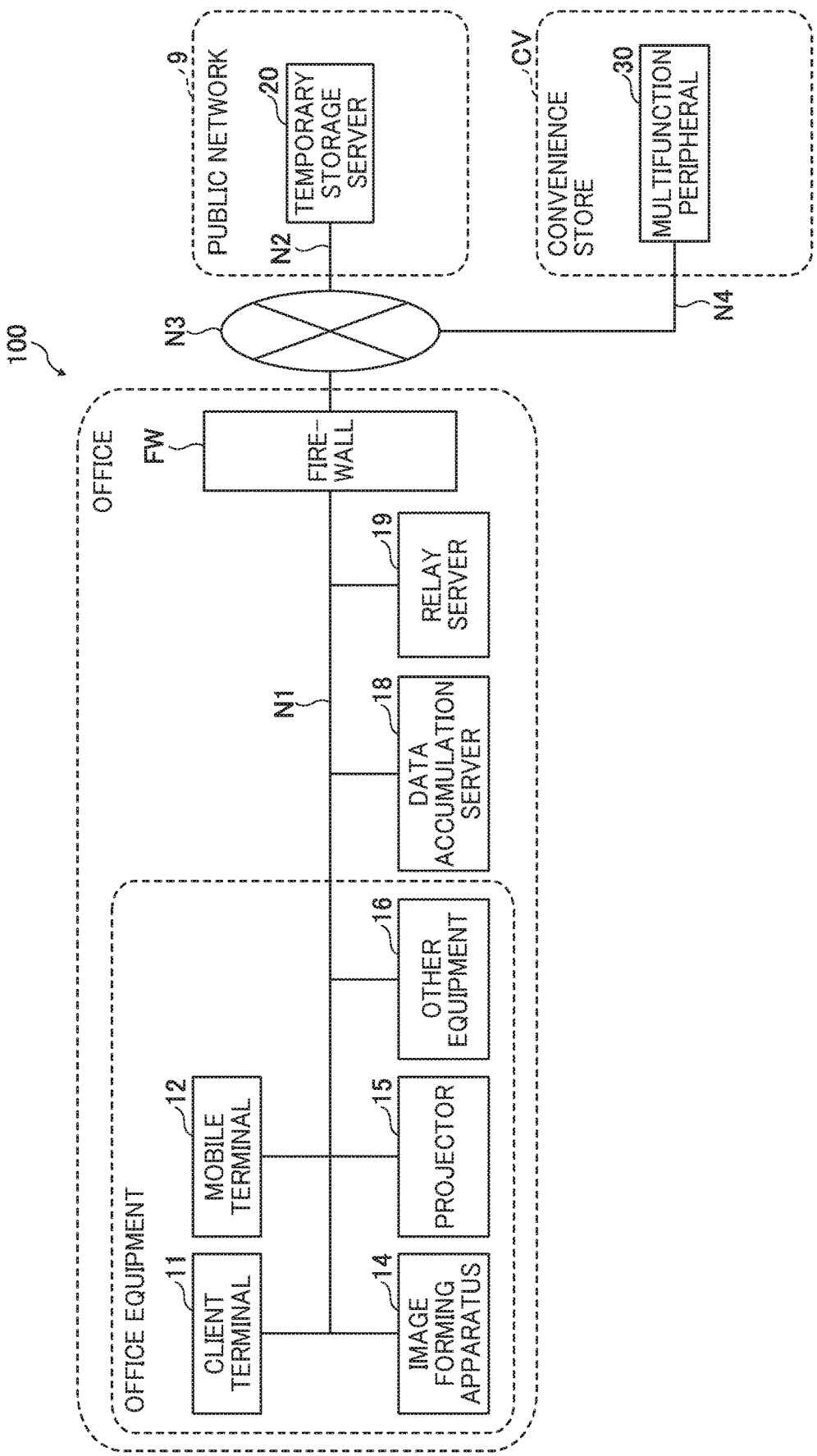
FIG. 2 is a schematic diagram illustrating a configuration of the device system, according to the first embodiment.

FIG. 2 is a diagram of an example configuration of the device system 100 according to the present embodiment. The device system 100 in FIG. 2 includes a private network N1 such as an in-office network, a public network N2 represented by a cloud service, a network N3 such as the Internet, and a private network N4 possessed by a convenience store CV. The network N1 corresponds to the private network 8, and the network N2 corresponds to the public network 9. The public network 9 is a network (for example, the Internet) shared by an unspecified number of people. The private network refers to a network not open to the public (for example, the Internet), and refers to, for example, a network inside a firewall or an intranet.

The network N1 and the network N3 are connected by a firewall FW on the side of the network N1. The firewall FW is installed at a contact point between the network N1 and the network N3, and relays access from the network N1 to the network N3 and basically blocks access from the network N3 to the network N1 (in exceptional cases, relays a response from the network N3 to transmission from the network N1).

The network N1 is a private network inside the firewall FW. The client terminal 11, a mobile terminal 12, an image forming apparatus 14 such as a printer and a copying machine, a projector 15, other equipment 16, the data accumulation server 18, and a relay server 19 are connected to the network N1.

The client terminal 11 is an example of a terminal device. The client terminal 11 is implemented by an information processing apparatus (computer system) on which a general operating system (OS) or the like is installed. The client terminal 11 includes a wireless communication unit or a wired communication unit. The client terminal 11 is a terminal that can be operated by the user, such as a tablet personal computer (PC), or a notebook PC.

The mobile terminal 12 is an example of a terminal device. The mobile terminal 12 includes a wireless communication unit, and may further be provided with a wired communication unit. The mobile terminal 12 is a terminal that can be carried by the user, such as a smartphone, a mobile phone, a tablet PC, or a notebook PC. The mobile terminal 12 may be operated as the client terminal 11.

The image forming apparatus 14 is an apparatus having an image forming function. The image forming apparatus 14 includes a wireless communication unit or a wired communication unit. The image forming apparatus 14 is an apparatus that performs processing related to image formation, such as a copying machine, a scanner, a printer, or a laser printer. The projector 15 is a device that projects an image. The projector 15 includes a wireless communication unit or a wired communication unit.

The client terminal 11, the mobile terminal 12, the image forming apparatus 14, the projector 15, and other equipment 16 are examples of equipment used in the office. The image forming apparatus 14 and the projector 15 can process data to be processed.

The data accumulation server 18 is implemented by an information processing apparatus (computer system) on which a general server OS or the like is installed. The data accumulation server 18 encrypts and accumulates a document registered by the client terminal 11.

The relay server 19 is implemented by an information processing apparatus (computer system) on which a general server OS or the like is installed. The relay server 19 monitors the temporary storage server 20 and transmits a document to the temporary storage server 20, and the like. Among the devices in the network N1, only the relay server 19 can monitor and communicate with the temporary storage server 20. The relay server 19 goes beyond the firewall FW by, for example, polling the temporary storage server 20 in each preset period, time, and event. In the case where the firewall FW is a proxy server-type firewall, the administrator or the like sets permission of a notification from a predetermined IP address (in this case, an IP address of the temporary storage server 20) at a predetermined port to the firewall FW to enable push notification from the temporary storage server 20 to the relay server 19. Further, once connection is established from the relay server 19 to the temporary storage server 20, data can be transmitted from the temporary storage server 20 to the relay server 19 in the firewall FW at arbitrary timing by using a two-way communication technology such as WebSocket.

The network N2 is connected to the network N3 such as the Internet. The temporary storage server 20 is connected to the network N2.

The temporary storage server 20 is implemented by an information processing apparatus (computer system) on which a general server OS or the like is installed. The temporary storage server 20 temporarily stores the document transmitted from the relay server 19 for at least a certain period of time. When a certain period of time has elapsed, when printing of the document is completed, or when a deletion request is accepted from the data accumulation server 18 or a user, the document is deleted.

The temporary storage server 20 is favorably compatible with cloud computing. Cloud computing is a use form in which resources on a network are used without being conscious of a specific hardware resource.

The network N4 is connected to the network N3 such as the Internet. The MFP 30 is connected to the network N4. The network N4 is the private network 8 such as a LAN laid in the convenience store CV as an example. The convenience store CV is an example of a facility where the MFP 30 is installed and may be a public institution such as a city office or a commercial facility such as a department store. The facility where the MFP 30 is installed may be of a company different from the company where the data accumulation server 18 is installed, and may be a home of an employee as long as the MFP 30 can be installed. In this way, the MFP 30 in the convenience store CV may be a MFP in a place accessible to the network N3.

Although the MFP 30 is a device that prints a document, the MFP 30 has a function as an information processing apparatus. In the present embodiment, the MFP 30 may be called image forming apparatus, printing device, or printer because the MFP 30 has at least a printing function. The MFP 30 may also have a function of scanner, facsimile, or copier.

<Hardware Configuration>

<<Data Accumulation Server>>

Figure 3:
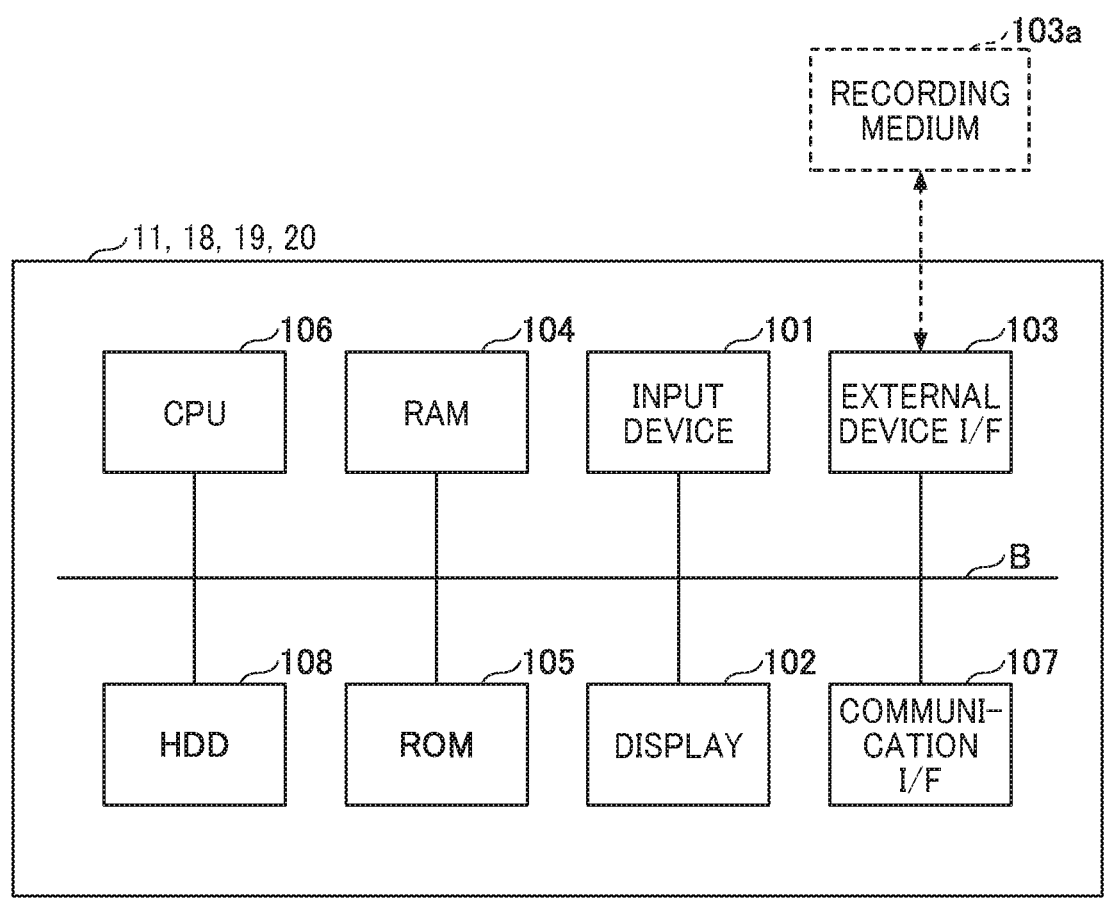
FIG. 3 is a schematic diagram illustrating a hardware configuration of a computer implementing various devices in the device system, according to the one or more embodiments.

The client terminal 11, the data accumulation server 18, the relay server 19, and the temporary storage server 20 in FIG. 2 are each implemented by, for example, a computer system having a hardware configuration illustrated in FIG. 3. FIG. 3 is an example of a hardware configuration diagram of various devices according to the present embodiment.

The computer system illustrated in FIG. 3 includes an input device 101, a display 102, an external device interface (I/F) 103, a random access memory (RAM) 104, a read only memory (ROM) 105, a central processing unit (CPU) 106, a communication I/F 107, a hard disk drive (HDD) 108, and the like, and the aforementioned elements are mutually connected via a bus B.

The input device 101 includes a keyboard, a mouse, a touch panel, and the like, and is used by a user to input instructions to cause to generate operation signals. The display 102 includes a display and the like, and displays a processing result by the computer system.

The communication I/F 107 is an interface for connecting the computer system to the network N1 or N2. With the configuration, the computer system can perform data communication via the communication I/F 107.

The HDD 108 is a nonvolatile storage device that stores programs and data. Examples of the stored programs and data include an operating system (OS) that is basic software for controlling the entire computer system, and application software that provides various functions on the OS. The HDD 108 manages the stored programs and data by a predetermined file system and/or a database (DB).

The external device I/F 103 is an interface for communication with an external device. An example of the external device includes a recording medium 103a. With the configuration, the computer system can read and/or write data from and/or to the recording medium 103a via the external device I/F 103. Examples of the recording medium 103a include a flexible disk, a compact disk (CD), a digital versatile disk (DVD), a secure digital (SD) memory card, and a universal serial bus (USB) memory.

The ROM 105 is a nonvolatile semiconductor memory (storage device) capable of storing programs and data such that the programs and data are kept even when the power is turned off. The ROM 105 stores programs and data of a basic input/output system (BIOS), OS setting, network setting, and the like, which are executed at the start of the computer system. The RAM 104 is a volatile semiconductor memory (storage device) that temporarily stores programs and data.

The CPU 106 is a processor capable of calculating, which reads the programs and data from the storage device such as the ROM 105 or the HDD 108 onto the RAM 104 and executes processing to implement control and functions of the entire computer system.

The client terminal 11, the mobile terminal 12, the data accumulation server 18, the relay server 19, and the temporary storage server 20 in FIG. 2 according to the present embodiment can implement various types of processing as described below with the above hardware configuration.

<<MFP 30>>

Figure 4:
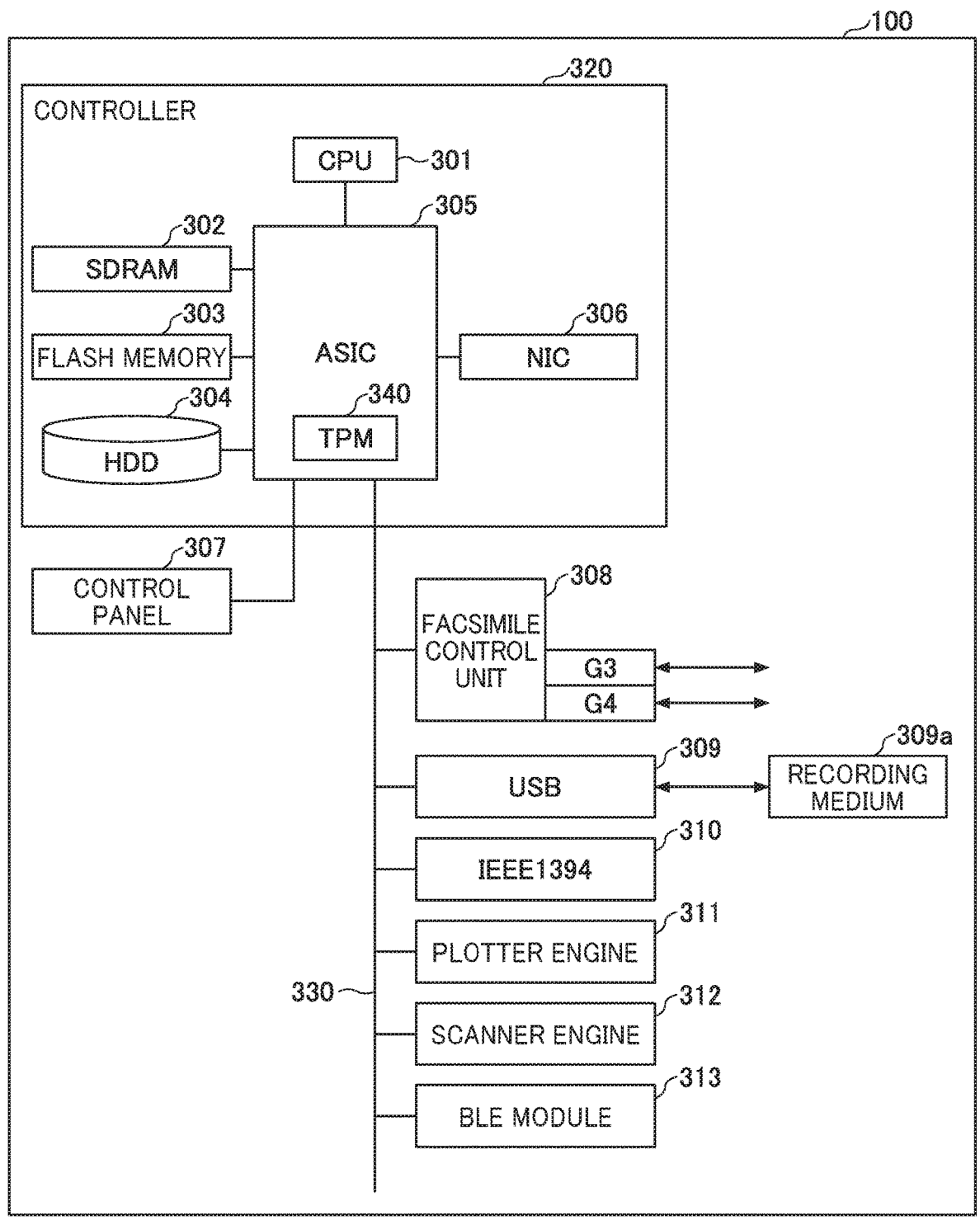
FIG. 4 is a schematic diagram illustrating a hardware configuration of a multifunction peripheral in the device system, according to the one or more embodiments.

FIG. 4 is an example of a hardware configuration diagram of the MFP 30. The MFP 30 includes a controller 320. The controller 320 includes a CPU 301, an application specific integrated circuit (ASIC) 305, a synchronous dynamic random access memory (SDRAM) 302, a flash memory 303, a hard disk drive (HDD) 304, and a network interface card (NIC) 306. As illustrated in FIG. 4, the MFP 30 has a function as an information processing apparatus.

The ASIC 305 is a multifunction device board including a CPU interface, an SDRAM interface, a local bus interface, a peripheral component interconnect (PCI) bus interface, a media access controller (MAC), an HDD interface, and the like.

A trusted platform module (TMP) chip 340 included in the ASIC 305 has an encryption key, and the encryption key is managed by the TMP chip 340 itself. Therefore, the controller 320 is resistant to external attacks, and has a low risk of information leakage due to theft and analysis of data in HDD 304.

The CPU 301 reads and executes various programs from the HDD 304 via the ASIC 305. The SDRAM 302 functions as a program memory that stores various programs, a work memory used when the CPU 301 executes various programs, and the like. A DRAM or an SRAM may be used in place of the SDRAM 302.

The flash memory 303 is a nonvolatile memory, and stores a boot loader (boot program) for activating the MFP 30 and an OS. The flash memory 303 also functions as a memory that stores programs. Further, the flash memory 303 functions as a service memory that stores applications of services (a copy service, a print service, and a facsimile service). Further, the flash memory 303 functions as a firm memory that stores firmware, and a data memory that stores a network address, a model number, and the like.

Note that another nonvolatile memory such as a nonvolatile RAM in which a backup circuit using a RAM and a battery are integrated or an electrically erasable programmable read-only memory (EEPROM) may be used in place of the flash memory 303.

The HDD 304 is a nonvolatile storage medium that stores data irrespective of whether the power of the MFP 30 is on or off. The HDD 304 records programs and data other than the programs and data stored in the flash memory 303. The HDD 304 may be used as a firm memory.

The NIC 306 is a communication device for communicating with various devices via a network such as a LAN. A control panel 307 is connected to the controller 320. The control panel 307 includes various operation keys, a liquid crystal display (LCD) or a cathode-ray tube (CRT) character display as a display, and a touch panel, and is used when a user U inputs various instructions to the MFP 30.

Further, a facsimile control unit 308, a USB 309 to/from which a storage medium 309a is attachable/detachable, an Institute of Electrical and Electronic Engineers (IEEE) 1394 (310), a plotter engine 311, a scanner engine 312, and a Bluetooth low energy (BLE) module 313 are connected to the controller 320 via a PCI bus 330. With the configuration, the MFP 30 can provide services such as a copy service, a print service, and a facsimile service. The plotter engine 311 may employ either an electrophotography method or an inkjet method.

Note that the illustrated configuration is merely an example, and the hardware configuration of the MFP 30 is not limited to the configuration in FIG. 4. For example, the NIC 306 may be connected to the PCI bus 330. Further, the NIC 306 may be wirelessly connected to the network N4 by a wireless LAN besides by wired means. There may be a plurality of NICs 306.

Further, a digital service unit (DSU) or a modem connected to a telephone line network may be included in place of or in addition to the NIC 306. A communication device connected to a mobile phone network may be included.

<Functions>

Figure 5:
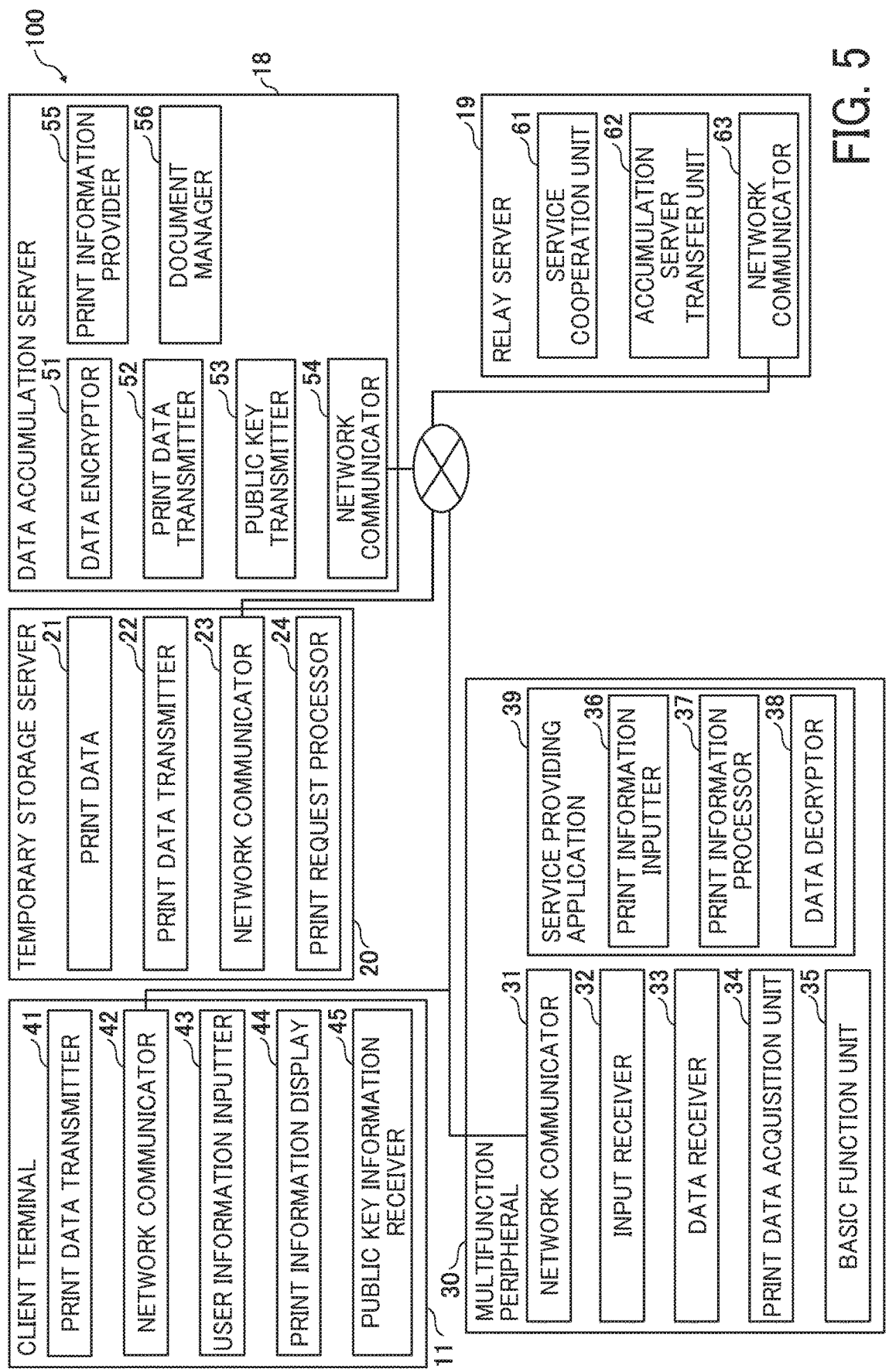
FIG. 5 is a schematic diagram illustrating a functional configuration of a client terminal, a temporary storage server, a data accumulation server, a relay server, and a MFP included in the device system of FIG. 2, according to the first embodiment.

FIG. 5 is an example of a functional block diagram illustrating functions of the client terminal 11, the temporary storage server 20, the data accumulation server 18, the relay server 19, and the MFP 30 included in the device system 100 in a block manner.

<<Client Terminal 11>>

The client terminal 11 includes a print data transmitter 41, a network communicator 42, a user information inputter 43, a print information display 44, and a public key information receiver 45.

The print data transmitter 41 transmits a user name, a document, and the like to the data accumulation server 18. The print data transmitter 41 is implemented by the CPU 106 in FIG. 3 executing a program and being operated in cooperation with the network communicator, and the like.

The network communicator 42 provides a function to connect the client terminal 11 to the network N1. The network communicator 42 is implemented by the CPU 106 in FIG. 3 executing a program to control the communication I/F 107, and the like. Although the network communicator is included in each device of the device system 100, description that the each device performs communication using the network communicator is omitted in some cases for simplification of description.

The user information inputter 43 displays a use registration screen illustrated in FIG. 7 described below on the display 102 and receives input of user information from the user. Further, the user information inputter 43 displays a user name in FIG. 8. The user information inputter 43 is implemented by the CPU 106 in FIG. 3 executing a program to control the display 102, and the like.

Figure 10:
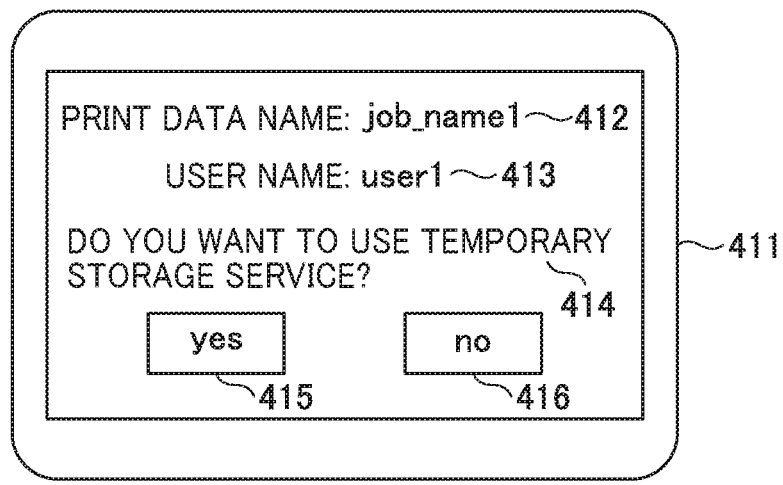
FIG. 10 is an example of an input screen that requests the user to determine whether to use the temporary storage server, displayed on the client terminal, according to the first embodiment.
Figure 11:
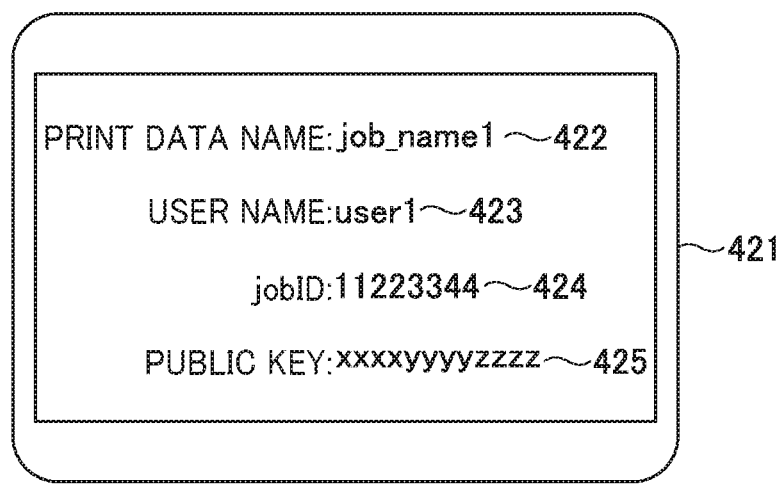
FIG. 11 is an example of a print information screen, displayed on the client terminal, according to the first embodiment.

The print information display 44 displays an input screen as illustrated in FIG. 10 to be described below and a print information screen as illustrated in FIG. 11 on the display 102. The print information display 44 is implemented by the CPU 106 in FIG. 3 executing a program to control the display 102, and the like.

The public key information receiver 45 receives a public key created by the data accumulation server. The public key information receiver 45 is implemented by the CPU 106 in FIG. 3 executing a program and being operated in cooperation with the network communicator, and the like <<Relay Server 19>>

The relay server 19 includes a service cooperation unit 61, an accumulation server transfer unit 62, and a network communicator 63.

The service cooperation unit 61 performs communication for being in cooperation with the temporary storage server 20 in the network N2. Further, the service cooperation unit 61 monitors the temporary storage server 20 and receives various notifications from the temporary storage server 20. The service cooperation unit 61 is implemented by the CPU 106 in FIG. 3 executing a program to control the communication I/F 107, and the like.

The accumulation server transfer unit 62 acquires a list of registered documents from the data accumulation server 18, and requests and acquires the document from the data accumulation server 18. Furthermore, the accumulation server transfer unit 62 transmits the document acquired from the data accumulation server 18 to the temporary storage server 20 at any desired time. The accumulation server transfer unit 62 is implemented by the CPU 106 in FIG. 3 executing a program to control the communication I/F 107, and the like.

The network communicator 63 provides a function to connect the relay server 19 to the network N4. The network communicator 63 is implemented by the CPU 106 in FIG. 3 executing a program to control the communication I/F 107, and the like.

<<Data Accumulation Server>>

The data accumulation server 18 includes a data encryptor 51, a print data transmitter 52, a public key transmitter 53, a network communicator 54, a print information provider 55, and a document manager 56.

The data encryptor 51 encrypts the document by a general public key encryption method using date and time data when the document has been registered as a key. The data encryptor 51 is implemented by the CPU 106 in FIG. 3 executing a program, and the like.

The print data transmitter 52 transmits the document to the relay server 19 in response to a request from the relay server 19. The print data transmitter 52 is implemented by the CPU 106 in FIG. 3 executing a program to control the communication I/F 107, and the like.

The public key transmitter 53 transmits the public key to the client terminal 11. The public key transmitter 53 is implemented by the CPU 106 in FIG. 3 executing a program to control the communication I/F 107, and the like.

The network communicator 54 provides a function to connect the data accumulation server 18 to the network N1. The network communicator 54 is implemented by the CPU 106 in FIG. 3 executing a program to control the communication I/F 107, and the like.

The print information provider 55 function as a web server, which provides print information as illustrated in FIGS. 10 and 11 to be described below to the MFP 30 to display the print information. The print information provider 55, as a web server, further transmits screen information described in HTML or the like to the MFP 30. The print information provider 55 is implemented by the CPU 106 in FIG. 3 executing a program, and the like.

The document manager 56 stores the encrypted document. The document manager 56 is implemented by the CPU 106 in FIG. 3 executing the program to control the HDD 108, the RAM 104, and the like in FIG. 3. The document manager 56 stores a document management table, for example, Table 1 to be described below. Although the document manager 56 manages the document in the document management table that is the same as the temporary storage server 20, the document management table of the data accumulation server 18 and the document management table of the temporary storage server 20 are not necessarily exactly the same.

<<Temporary Storage Server>>

The temporary storage server 20 includes a print data storage 21, a print data transmitter 22, a network communicator 23, and a print request processor 24.

The print data storage 21 stores the encrypted document and a state of the document in association with the job ID. Table 1 illustrates the document management table stored in the print data storage 21. The print data storage 21 is implemented by the CPU 106 in FIG. 3 executing a program to control the HDD 108, the RAM 104, and the like.

The print data transmitter 22 transmits the encrypted document stored in the print data storage 21 to the MFP 30. The print data transmitter 22 is implemented by the CPU 106 in FIG. 3 executing a program to control the communication I/F 107, and the like.

The network communicator 23 provides a function to connect the data accumulation server 18 to the network N2. The network communicator 23 is implemented by the CPU 106 in FIG. 3 executing a program to control the communication I/F 107, and the like.

The print request processor 24 functions as a web server and performs control regarding printing of a document when a request to print the document is given from the MFP 30. The print request processor 24 is implemented by the CPU 106 in FIG. 3 executing a program, and the like.

<<Multifunction Peripheral>>

The MFP 30 includes a network communicator 31, an input receiver 32, a data receiver 33, a print data acquisition unit 34, and a basic function unit 35. The MFP 30 further implements a print information inputter 36, a print information processor 37, and a data decryptor 38 by a service providing application 39. The service providing application 39 is one of application software installed in the MFP 30. Since the service providing application 39 can be installed in the MFP 30 after shipment, the function of the present embodiment can be added to the MFP 30 in the convenience store CV or the like. However, the service providing application 39 may not be independent as a function.

The network communicator 31 provides a function to connect the MFP 30 to the network N4. The network communicator 31 is implemented by the CPU 301 in FIG. 4 executing a program to control the NIC 306, and the like.

The input receiver 32 receives input of the user to the MFP 30. The service providing application 39 is activated by an operation of the user. The input receiver 32 is implemented by the CPU 301 in FIG. 4 executing a program to control the control panel 307, and the like.

The data receiver 33 receives various data sent from the temporary storage server 20. The data receiver 33 is implemented by the CPU 301 in FIG. 4 executing a program to control the NIC 306, or the like.

The print data acquisition unit 34 acquires the encrypted document from the temporary storage server 20. The document is specified by the job ID. An error occurs if the job ID does not exist. The print data acquisition unit 34 is implemented by the CPU 301 in FIG. 4 executing a program to control the NIC 306, or the like.

The basic function unit 35 provides functions of printing, scanning, copying, and facsimile transmission, which are basic functions provided by the MFP 30. The basic function unit 35 is implemented by the CPU 301 in FIG. 4 executing a program to control the entire MFP 30, and the like.

The print information inputter 36 receives input of the job ID and the public key by the user. The print information inputter 36 is implemented by the CPU 301 in FIG. 4 executing the service providing application to control the NIC 306, and the like.

The print information processor 37 transmits the job ID input by the user together with a document acquisition request to the temporary storage server 20, and displays various types of information transmitted by the temporary storage server 20. The print information processor 37 is implemented by the CPU 301 in FIG. 4 executing the service providing application to control the NIC 306, and the like.

The data decryptor 38 decrypts the document with the public key input by the user. The data decryptor 38 is implemented by the CPU 301 in FIG. 4 executing the service providing application, and the like.

TABLE 1

| Job ID | Job data | Job status |
|--------|----------|------------|
| 1111   | aaaa     | Printable  |
| 1112   | bbbb     | Deleting   |
| 1113   | cccc     | Printable  |
| 1114   | dddd     | Printable  |
| 1115   | eeee     | Deleting   |

Table 1 illustrates the document management table managed by the print data storage 21 and the document manager 56. The document management table stores, for each job being registered, information on job data and a job status in association with the job ID identifying the job. The job data is an encrypted document, and the job status indicates what state the document is. There are "printable" and "deleting (deleted)" in the state of the document.

An initial state of the job status is "printable", and when the temporary storage server 20 receives the notification of print completion from the MFP 30, the state is transitioned to the state of "deleting". The document with the job status "deleting" is deleted from the document list displayed by the MFP 30 or the image forming apparatus 14 in the office.

Although not shown in Table 1, a user name (or a user ID) is favorably registered in the document management table. With the user name or user ID, the temporary storage server 20 can specify the document printable by the user.

<Registration Phase of Document>

In the device system 100 according to the present embodiment, the user accumulates the document in the data accumulation server 18 in the office before printing the document by the MFP 30 in the convenience store CV. Further, the user performs use registration to the device system 100 in the form of use registration, for example.

Figure 6:
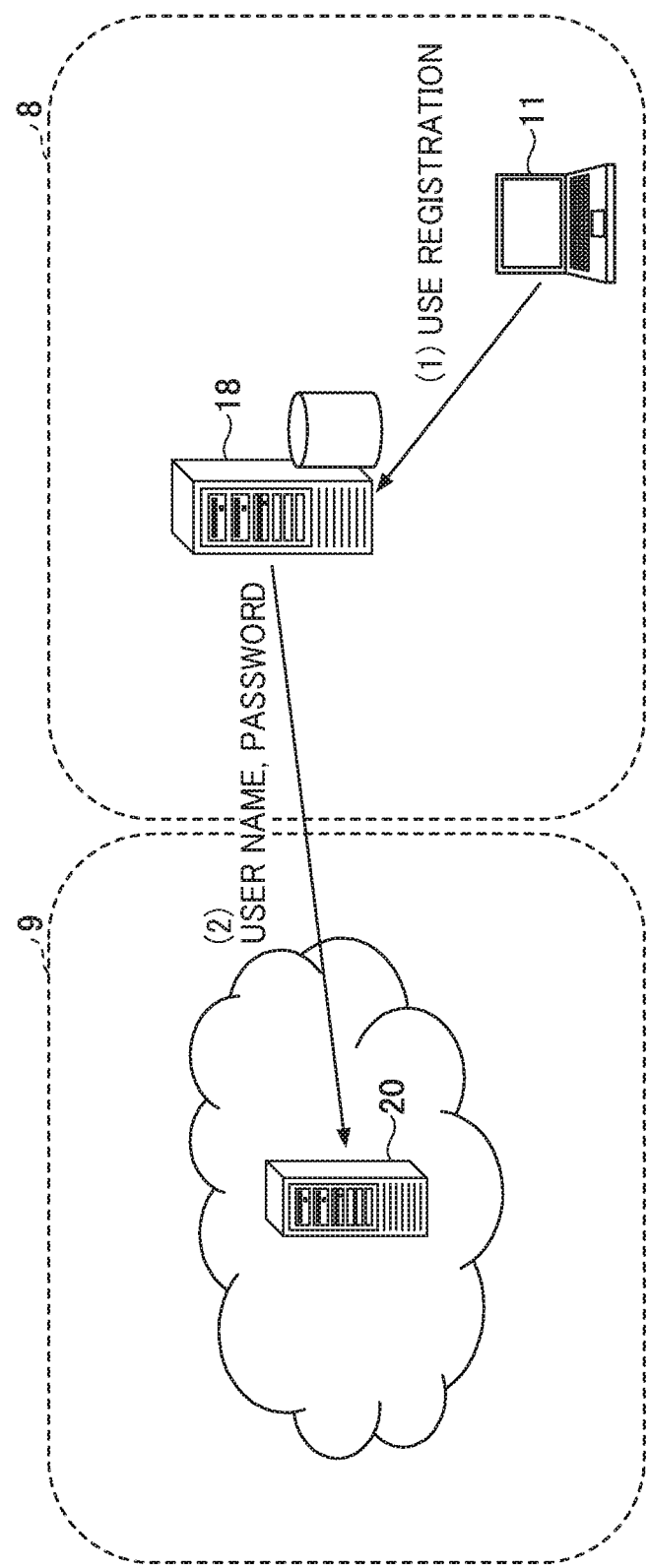
FIG. 6 is a schematic diagram for illustrating document registration performed by the device system of FIG. 5, according to the embodiment, according to the first embodiment.

FIG. 6 is an example of a diagram for describing document registration. FIG. 6 illustrates a system configuration partially taken from the system configuration in FIG. 2.

(1) First, the user operates the client terminal 11 to perform use registration to the data accumulation server 18. That is, the user inputs a user name, an e-mail address, and a login password of the user.

Figure 7:
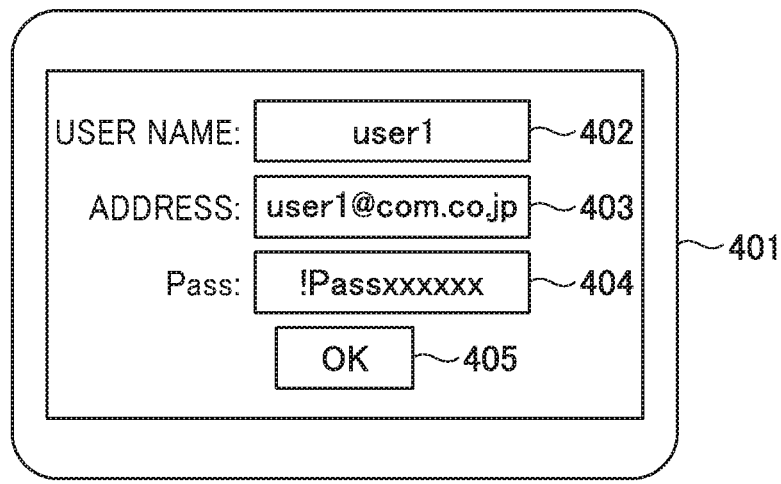
FIG. 7 is a diagram illustrating an example of a use registration screen, displayed on a display of the client terminal, according to the first embodiment.

FIG. 7 is a diagram illustrating an example of a use registration screen 401 displayed on the display of the client terminal 11. The use registration screen includes a user name input field 402, an e-mail address input field 403, a password input field 404, and an OK button 405. The user inputs the user name, the e-mail address, and the login password of the user, respectively, in the user name input field 402, the e-mail address input field 403, the password input field 404.

Description will be given referring back to FIG. 6.

(2) The data accumulation server 18 transmits information input by the user to the temporary storage server 20. As a result, the user can log in to the temporary storage server 20.

In the case where the user name input by the user has already existed, the temporary storage server 20 generates a uniquely identifiable user name and transmits the generated user name to the client terminal 11.

Figure 8:
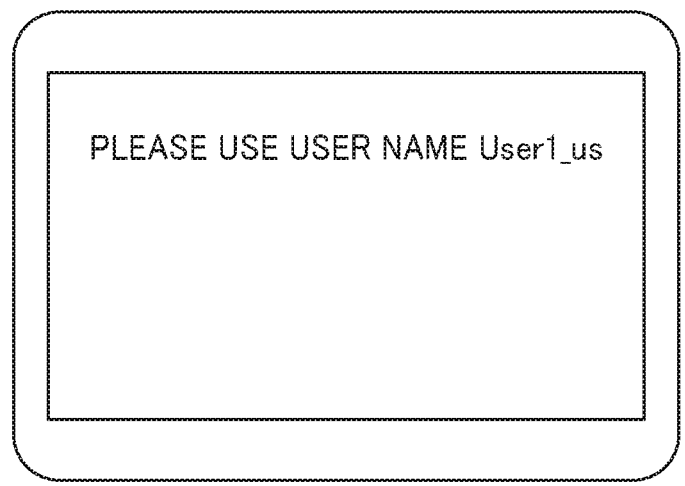
FIG. 8 is a diagram illustrating an example of a screen with a user name, displayed on the display of the client terminal, according to the first embodiment.

FIG. 8 is a diagram illustrating an example of a user name displayed on the display of the client terminal 11. In FIG. 8, "Please use user name User1_us" is displayed, and the user logs in to the device system 100 with the given user name instead of the input user name.

<Processing Flow>

Figure 9:
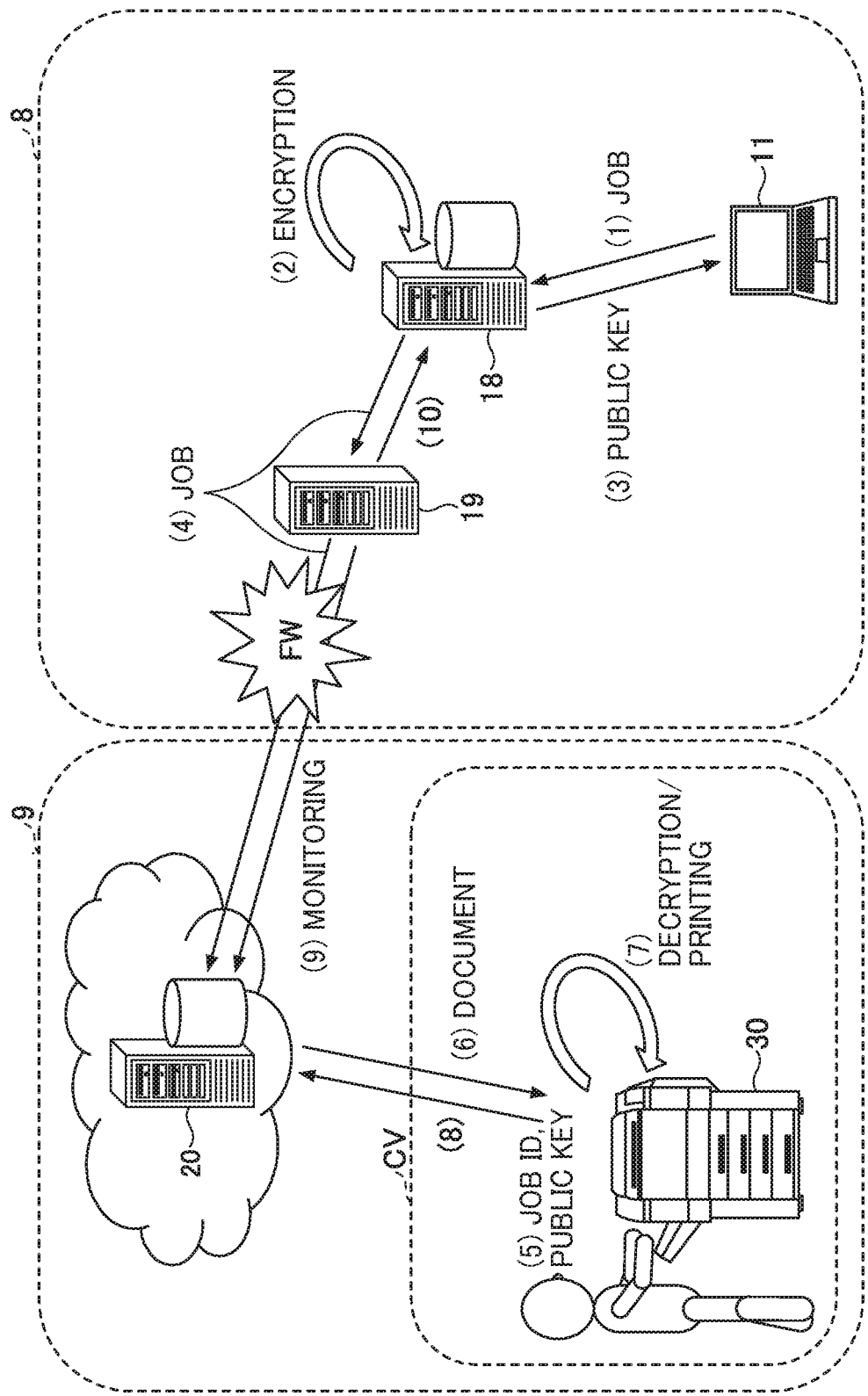
FIG. 9 is a schematic diagram for describing processing of the device system, according to the first embodiment.

An overall processing flow of the device system 100 will be described with reference to FIGS. 9 to 12B. FIG. 9 is an example of a diagram for describing processing of the device system 100.

(1) The user of the device system 100 operates the client terminal 11 to accumulate the document in the data accumulation server 18. The user logs in to the device system 100 using the user name and the login password. The user selects and registers the document to be printed. At that time, the user inputs whether to use the temporary storage server 20. FIG. 10 illustrates an input screen 411 as to whether to use the temporary storage server 20, displayed on the client terminal 11.

The input screen 411 includes a print data name 412, a user name 413, a message 414 of "Do you want to use temporary storage service?", a Yes button 415, and a No button 416. The print data name 412 is a file name or the like of the document selected by the user, and the user name 413 is specified by login.

The message 414 asks the user whether to use the temporary storage server 20. In the case where the user is planning to print the document at the convenience store CV (outside the company), the user presses the Yes button 415, otherwise presses the No button 416.

(2) In the case where the user presses the Yes button 415, the data accumulation server 18 encrypts the document with the public key generated using the date and time or the like transmitted from the client terminal 11 as a key.

(3) Further, the data accumulation server 18 causes the client terminal 11 to display the print information including the public key so that the document registered by the user can be printed outside the company. FIG. 11 illustrates an example of a print information screen 421 displayed on the client terminal 11. The print information screen 421 includes a print data name 422, a user name 423, a job ID 424, and a public key 425. On the screen, the user can check the public key and the job ID.

(4) The print data transmitter 52 of the data accumulation server 18 transmits the document to the temporary storage server 20 via the relay server 19. The relay server 19 transmits the document, the job ID, and the like to a URL of the temporary storage server 20, using a general protocol such as https. The temporary storage server 20 accumulates and stores the job.

Figure 12B:
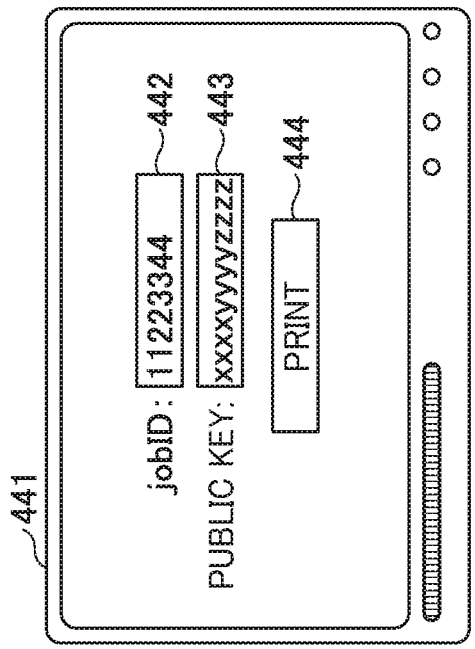
FIGS. 12A and 12B are examples of diagrams for describing an input of print information displayed on the MFP, according to the first embodiment.
Figure 12A:
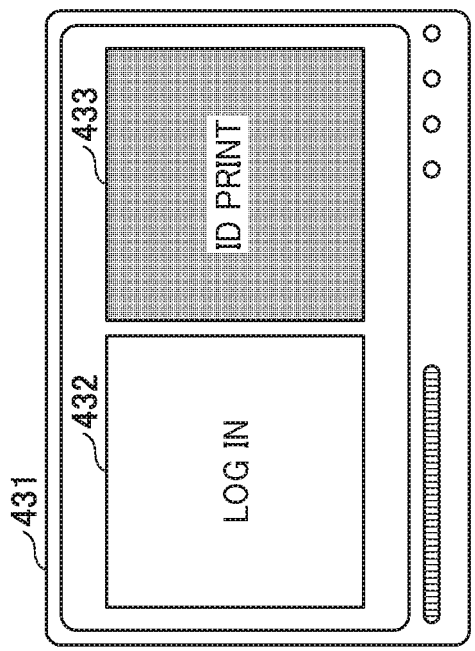

(5) Next, the user goes to the convenience store CV and activates the installed service providing application 39 in the MFP 30. Then, the user inputs the public key and the job ID. FIGS. 12A and 12B are examples of diagrams for describing an input of print information displayed on the MFP 30. FIG. 12A illustrates a screen 431 at the start of the service providing application, and FIG. 12B illustrates an example of a print information input screen 441. The screen 431 at the start includes a login button 432, and an ID print button 433. By pressing the login button 432, the user inputs the user ID and the login password and logs in to the temporary storage server 20 (or logs in to the device system 100).

Next, when the user presses the ID print button 433, the print information inputter 36 of the MFP 30 displays the print information input screen 441. The print information input screen 441 includes a job ID input field 442, a public key input field 443, and a print button 444. The user inputs the job ID and the public key, using the print information displayed on the client terminal 11. If the job status of the document is "deleting", printing is not performed, and the print information inputter 36 of the MFP 30 displays "printed".

(6) In the case where the job status of the document is "printable", the print data acquisition unit 34 of the MFP 30 can acquire the document from the temporary storage server 20.

(7) The data decryptor 38 of the MFP 30 decrypts the document with the public key input by the user.

(8) The MFP 30 prints the document and transmits the notification of print completion to the temporary storage server 20 when having completed the printing. The temporary storage server 20 changes the job status of the printed document to "deleting".

(9) The relay server 19 monitors the job status of the document in the temporary storage server 20.

(10) In the case where there is a document that has been transitioned to "deleting", the relay server 19 notifies the data accumulation server 18 to cause state transition. The data accumulation server 18 changes the state of the notified document to "deleting". With the change, even if the image forming apparatus 14 tries to print the document in the company, the document name is not displayed on the list of documents. Further, the data of the document is deleted at any desired time, for example, at the time when no load is applied to the data accumulation server 18 (for example, when there is no processing performed at the data accumulation server 18).

<Operation Procedure>

Figure 13:
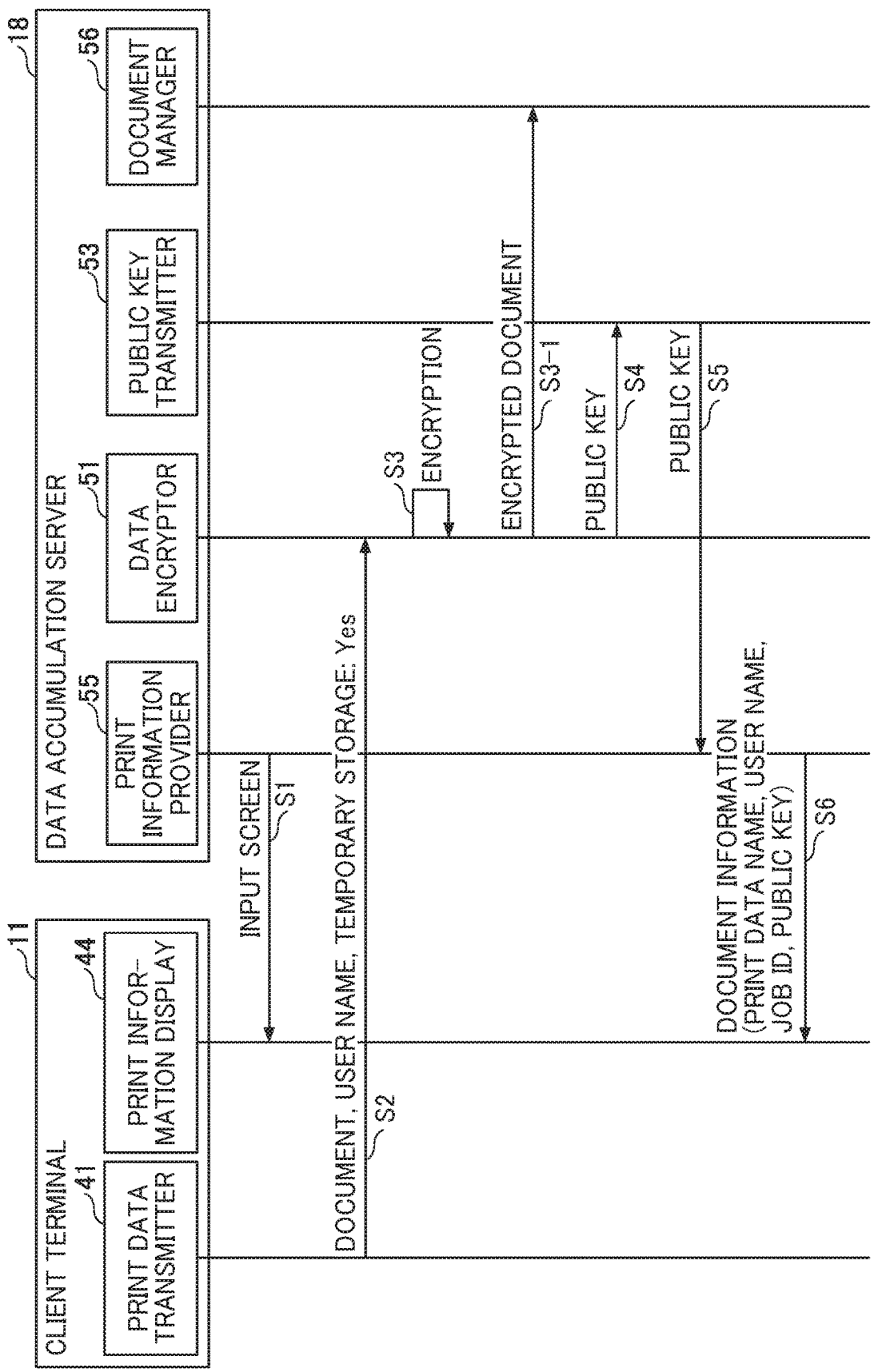
FIG. 13 is a sequence diagram illustrating a procedure in which the client terminal registers a document in the data accumulation server, according to the first embodiment.

An operation procedure of the device system 100 will be described with reference to FIGS. 13 to 15. FIG. 13 is an example of a sequence diagram illustrating a procedure in which the client terminal 11 registers a document in the data accumulation server 18. Note that the user has already logged in the device system 100, and the user name and the like are specified by the device system 100.

At S1, the print information display 44 of the client terminal 11 communicates with the data accumulation server 18 to display the input screen 411. The user inputs use of the temporary storage server 20 (Yes button) on the input screen 411. The print information display 44 receives the operation of the user.

At S2, The print data transmitter 41 of the client terminal 11 transmits the document to be registered by the user, the user name, and use of temporary storage to the data accumulation server 18.

At S3, the network communicator 54 of the data accumulation server 18 receives the transmitted data, and the data encryptor 51 generates the public key and encrypts the document to perform temporary storage. At S3-1, the data encryptor 51 causes the document manager 56 to store the encrypted document. The document manager 56 assigns a job ID and registers the job ID in the document management table. The initial job status is "printable".

At S4 and S5, the public key generated by the data encryptor 51 is sent to the print information provider 55 via the public key transmitter 53.

At S6, the print information provider 55 of the data accumulation server 18 transmits the document information (the print data name, the user name, the job ID, and the public key). The print data name may be a file name of the document given by the user or may be a name given by the data accumulation server 18.

As illustrated in FIG. 11, the print information display 44 of the client terminal 11 displays the print information (the print data name, the user name, the job ID, and the public key) on the display 102.

Figure 14:
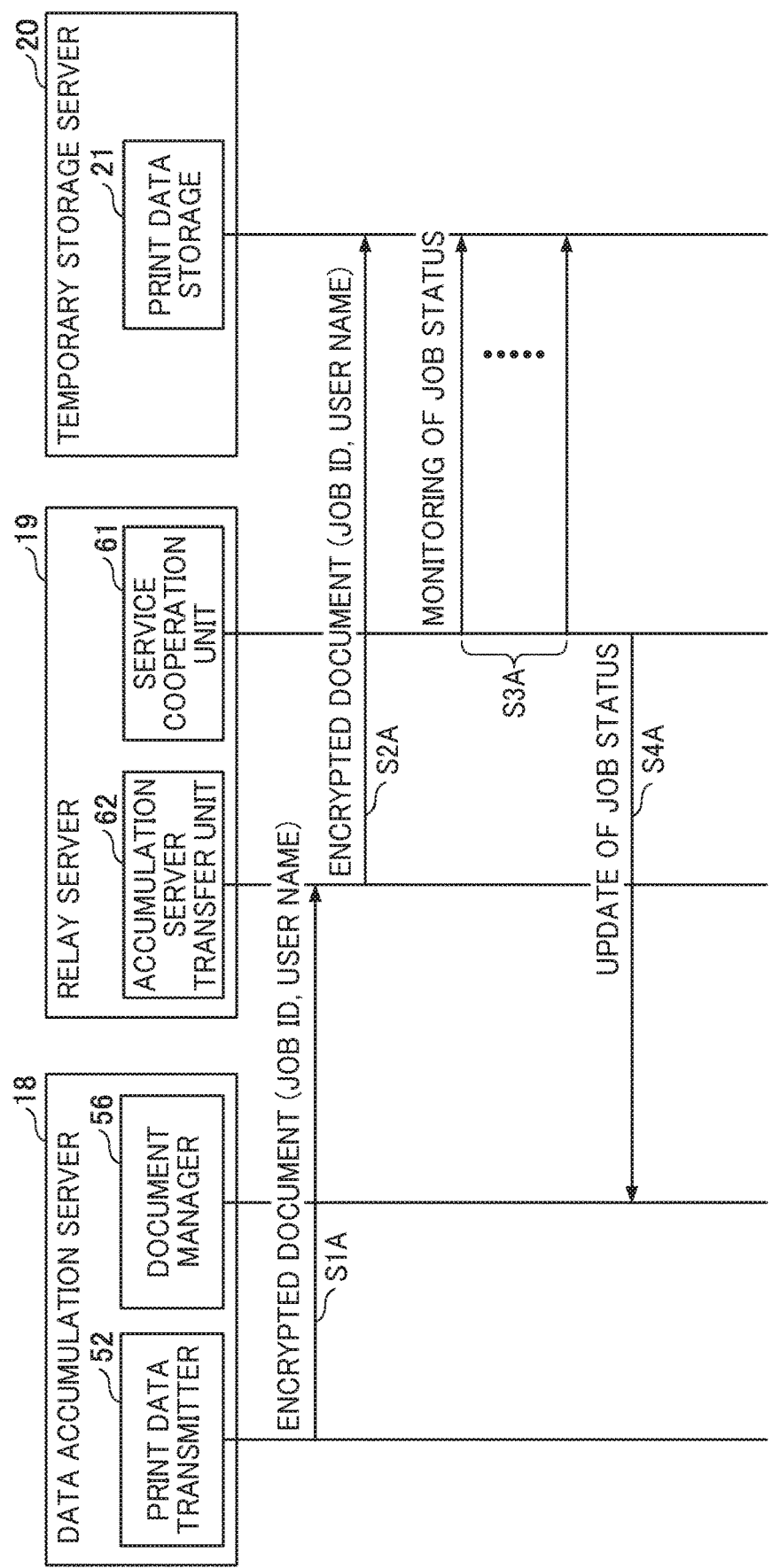
FIG. 14 is a sequence diagram illustrating a procedure in which the data accumulation server temporarily stores a document in the temporary storage server via the relay server, according to the first embodiment.

FIG. 14 is an example of a sequence diagram illustrating a procedure in which the data accumulation server 18 temporarily stores a document in the temporary storage server 20 via the relay server 19.

At S1A, when having detected that a document is newly registered in the document manager 56 of the data accumulation server 18, the print data transmitter 52 of the data accumulation server 18 transmits the encrypted document together with the job ID and the user name to the relay server 19. The job ID is transmitted for specifying the document registered by the user. Similarly, the user name is transmitted for specifying the document registered by the user. The time of transmission may be immediately after the registration, periodically, when the load of the data accumulation server 18 is equal to or less than a predetermined value, or the like.

At S2A, the accumulation server transfer unit 62 of the relay server 19 transmits the encrypted document together with the job ID and the user name to the temporary storage server 20. The time of the transmission could be any time, such that it may be immediately after the registration, periodically, when the load of the data accumulation server 18 is equal to or less than a predetermined value, or the like. The print data storage 21 of the temporary storage server 20 stores the document, and registers the job ID and the like to the document management table.

At S3A, the service cooperation unit 61 of the relay server 19 communicates with the temporary storage server 20 by polling, for example, and monitors the job status. Notification from the temporary storage server 20 to the relay server 19 may be made possible by WebSocket in addition to polling.

At S4A, when having detected update of the job status, the service cooperation unit 61 requests the data accumulation server 18 to update the job status together with the job ID.

With the update, the history as to whether the document has been printed can be managed even if the same document exists in the office and in the cloud side.

Figure 15:
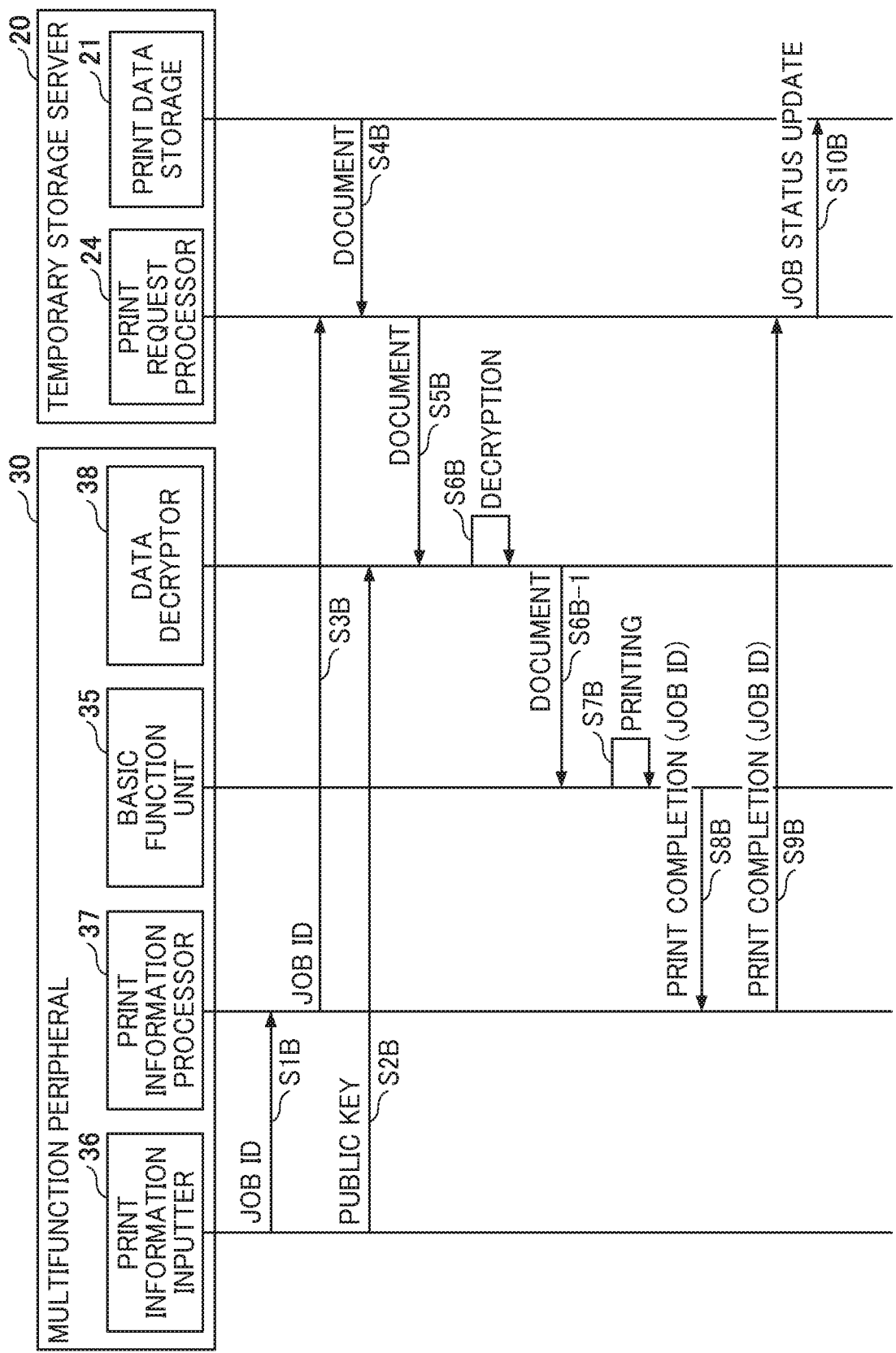
FIG. 15 is a sequence diagram illustrating a procedure in which the MFP prints a document in the temporary storage server, according to the first embodiment.

FIG. 15 is an example of a sequence diagram illustrating a procedure in which the MFP 30 prints a document in the temporary storage server 20. The user operates the MFP 30 in the convenience store CV and logs in to the device system 100 (FIG. 12A).

At S1B and S2B, for example, the print information inputter 36 displays the job ID of the document associated with the user ID on the control panel 307. As illustrated in FIG. 12B, the user inputs the public key and the job ID. The print information inputter 36 receives input of the job ID and the public key. The print information inputter 36 of the MFP 30 sends the job ID to the print information processor 37, and sends the public key to the data decryptor 38.

At S3B, the print information processor 37 of the MFP 30 transmits the job ID to the temporary storage server 20.

At S4B, the print request processor 24 of the temporary storage server 20 acquires the document associated with the job ID from the print data storage 21. At this time, no document is acquired in the case where the job status is "deleting".

At S5B, the print request processor 24 of the temporary storage server 20 transmits the encrypted document to the MFP 30.

At S6B, the network communicator 31 of the MFP 30 receives the document, and the data decryptor 38 decrypts the document with the public key input by the user. At S6B-1, the data decryptor 38 sends the decrypted document to the basic function unit 35.

At S7B, the basic function unit 35 of the MFP 30 prints the document.

At S8B, when the printing has been completed, the basic function unit 35 sends the notification that the printing has been completed to the print information processor 37.

At S9B, the print information processor 37 of the MFP 30 transmits the print completion notification together with the job ID to the temporary storage server 20.

At S10, the print request processor 24 of the temporary storage server 20 changes the job status of the document stored in the print data storage 21 and printed to "deleting".

With the change, as illustrated in FIG. 14, the service cooperation unit 61 of the relay server 19 can detect that the job status of the document has been transitioned to "deleting". Therefore, the document manager 56 of the data accumulation server 18 can change the state of the notified document to "deleting", and can cause the document printed outside not to be displayed on the list of documents at printing in the office.

As described above, the device system 100 of the present embodiment temporarily stores the document encrypted with the public key in the public network 9, and the user inputs the public key to the MFP 30 in the convenience store CV to print the document at the convenience store CV. Further, the data accumulation server 18 can detect that the document in the temporary storage server 20 has been printed by the relay server 19, and can update the job status.

In the present embodiment, communication between the public network 9 and the private network 8 is enabled mainly by polling or WebSocket. However, in the first embodiment, the communication between the public network 9 and the private network 8 is enabled using a simple mail transfer protocol (SMTP) server, which will be described in the second embodiment.

Second Embodiment

In the second embodiment, a device system 100 provided with an authentication server 17, and which authenticates a user when a request for document is given from a MFP 30, and transmits the document in the data accumulation server 18 to a temporary storage server 20 will be described.

Figure 16:
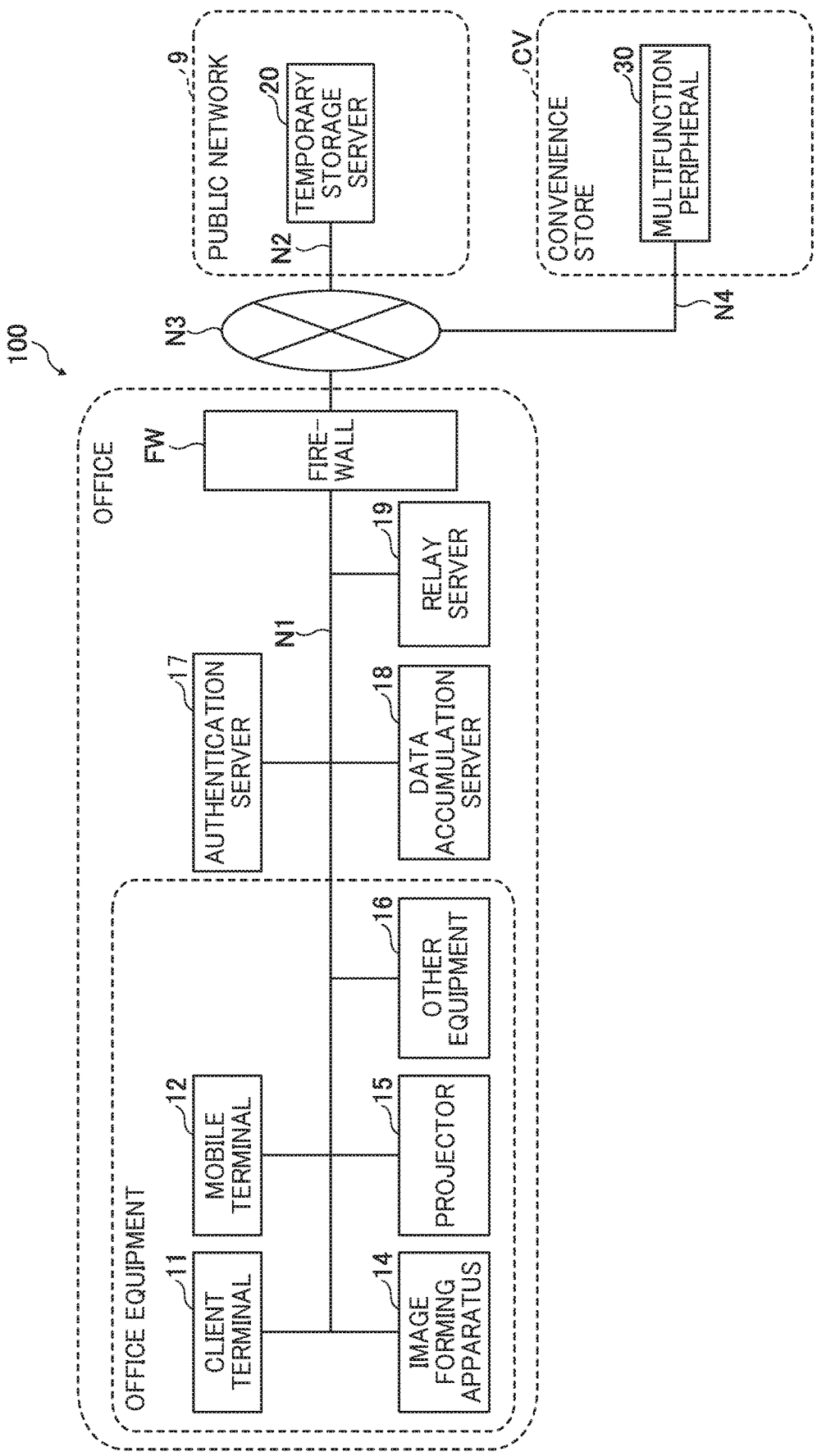
FIG. 16 is a schematic diagram illustrating a configuration of the device system, according to a second embodiment.

FIG. 16 is a configuration diagram of an example of the device system 100 according to the present embodiment. In the description of FIG. 16, the difference from FIG. 2 will be described. The authentication server 17 can be implemented by an information processing apparatus (computer system) on which a general server OS or the like is installed. The authentication server 17 includes a wireless communication unit or a wired communication unit. The authentication server 17 stores a user name and a login password registered in advance by a user in association with each other.

<Functions>

Figure 17:
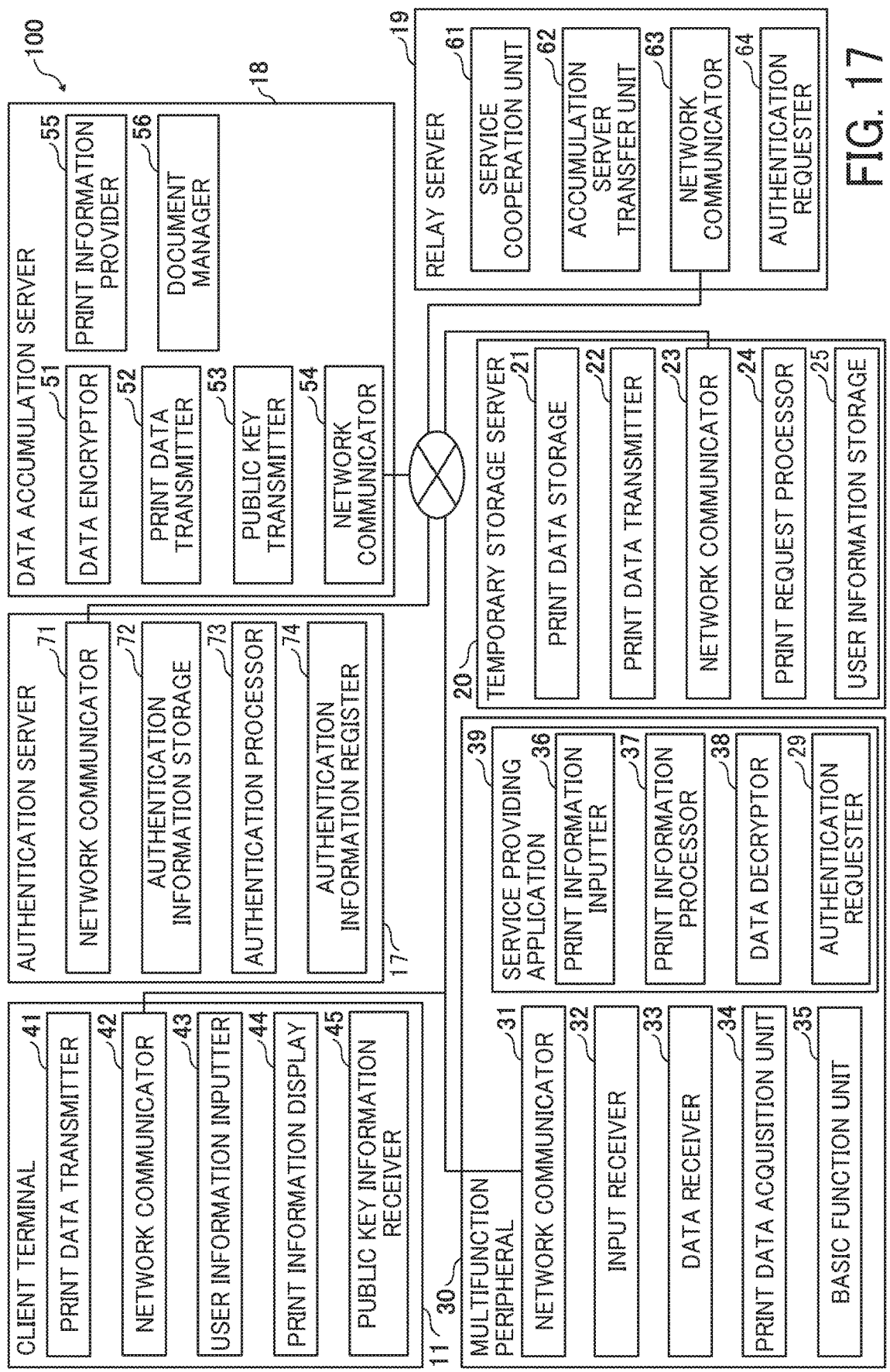
FIG. 17 is a schematic diagram illustrating a functional configuration of a client terminal, a temporary storage server, a data accumulation server, a relay server, and a MFP included in the device system of FIG. 16, according to the second embodiment.

FIG. 17 is an example of a functional block diagram illustrating functions of the client terminal 11, the temporary storage server 20, the data accumulation server 18, a relay server 19, and the MFP 30 included in the device system 100. In the description of FIG. 17, the difference from FIG. 5 will be described.

<<Authentication Server>>

The authentication server 17 includes a network communicator 71, an authentication information storage 72, an authentication processor 73, and an authentication information register 74.

The network communicator 71 provides a function to connect the authentication server 17 to a network N1. The network communicator 71 is implemented by a CPU 106 in FIG. 3 executing a program to control a communication I/F 107, and the like.

The authentication information storage 72 stores information necessary for authentication such as the user name and the login password. Table 3 illustrates the authentication information managed by the authentication information storage 72. The authentication information storage 72 is implemented by the CPU 106 in FIG. 3 executing a program to control an HDD 108, a RAM 104, and the like in FIG. 3.

The authentication processor 73 compares authentication request information transmitted from the temporary storage server 20 (to be precise, the relay server 19) with the authentication information managed by the authentication information storage 72 to authenticate the user. The authentication processor 73 is implemented by the CPU 106 in FIG. 3 executing a program, and the like.

The authentication information register 74 registers the authentication information transmitted from the client terminal 11 to the authentication information storage 72. The authentication information register 74 is implemented by the CPU 106 in FIG. 3 executing a program, and the like.

<<MFP 30, Temporary Storage Server 20, Relay Server 19, and Data Accumulation Server 18>>

The MFP 30 additionally includes an authentication requester 29, compared to the MFP 30 of the first embodiment. The authentication requester 29 receives the authentication request information necessary for user authentication and displays the authentication request information on a control panel 307. The authentication requester 29 is implemented by a CPU 301 in FIG. 4 executing a service providing application, and the like.

The temporary storage server 20 additionally includes a user information storage 25, compared to the temporary storage server 20 of the first embodiment. The user information storage 25 stores user information on the user. The user information storage 25 is implemented by the CPU 106 in FIG. 3 executing a program to control the HDD 108, the RAM 104, and the like in FIG. 3. The user information managed by the user information storage 25 is illustrated in Table 4.

The relay server 19 additionally includes an authentication requester 64, compared to the relay server 19 of the first embodiment. The authentication requester 64 requests the authentication server 17 to perform authentication together with the authentication request information input in the MFP 30. The authentication requester 64 is implemented by the CPU 106 in FIG. 3 executing a program, and the like.

The data accumulation server 18 of the second embodiment is substantially the same to the data accumulation server 18 of the first embodiment, except for document management information being managed.

The document manager 56 of the data accumulation server 18 manages information related to documents, as illustrated in Table 2 in the present embodiment.

TABLE 2

| User name | Secret key | E-mail address | Job name (job ID) | Job data | Job status |
|---|---|---|---|---|---|
| mukai | Iiiiii | rrrrr@com.co.jp | jobname1 | data1 | Deleting |
| kobayashi | oooo | yyyyy@com.co.jp | jobname2 | data2 | Printable |
| suzuki | yyyyy | kkkk@com.co.jp | jobname3 | data3 | Deleting |
| kondo | bbbbb | ssss@com.co.jp | jobname4 | data4 | Printable |

Table 2 illustrates an example of document management information managed by the document manager 56. The document management information is information regarding documents managed by the data accumulation server 18. For example, the document management information includes items of a user name, a secret key, an e-mail address, a job name, job data, and a job status. The user name is identification information for identifying the user as described above. A user ID may be included in place of the user name. The secret key is an encryption key paired with a public key, and a secret key unique to each user is given. The e-mail address is an electronic mail address of the user. The job name is a file name of a document or the like, and has a function to identify the document. A job ID may be used in place of the job name. The job data indicates the data itself of the document, a storage location, or the like. The job status is the same as that in the first embodiment.

TABLE 3

| User name | Login password |
|---|---|
| mukai | mmmmm |
| kobayashi | kkkkkkkk |
| suzuki | ssssssss |
| kondo | dddddddd |

Table 3 illustrates an example of the authentication information managed by the authentication information storage 72. The authentication information is information for the authentication server 17 to authenticate the user. In the authentication information, the user name and the login password are associated with each other. The user name is the same as that in the document management information. The password is kept secret by the user and is information for authenticating the user.

TABLE 4

| User name | Public key | Print data | SMTP server address | Job status |
|---|---|---|---|---|
| mukai | abdabc | data1 | xxxxxx@qqqqq.co.jp | Deleting |
| kobayashi | xyzxyz | data2 | yyyyyy@ppppp.co.jp | Printable |
| suzuki | jojojojo | data3 | cccccc@qqqqq.japan.co.jp | Deleting |
| kondo | InInInIn | data4 | xxxxxx@qqqqq.co.jp | Printable |
| kobayashi ko | pppaaa | data5 | xxxxxx@qqqqq.co.jp | Printable |

Table 4 illustrates an example of the user information managed by the user information storage 25. The user information is information regarding the user. Table 4 includes items of a user name, a public key, print data, an SMTP server address, and a job status. The user name is the same as that in the document management information. The public key is generated by the data accumulation server 18 as a pair with the secret key. Although the print data is a document to be printed by the user, in the present embodiment, the temporary storage server 20 does not always store the document. The print data in Table 4 indicates the document temporarily held by the user in the process of printing. The print data in Table 4 may be the job name. The simple mail transfer protocol (SMTP) server is a transmission mail server in an office (on-premises), and an address (IP address) of the SMTP server is held for each user. The job status is the same as that in Table 1.

<Use Registration Phase>

Figure 18:
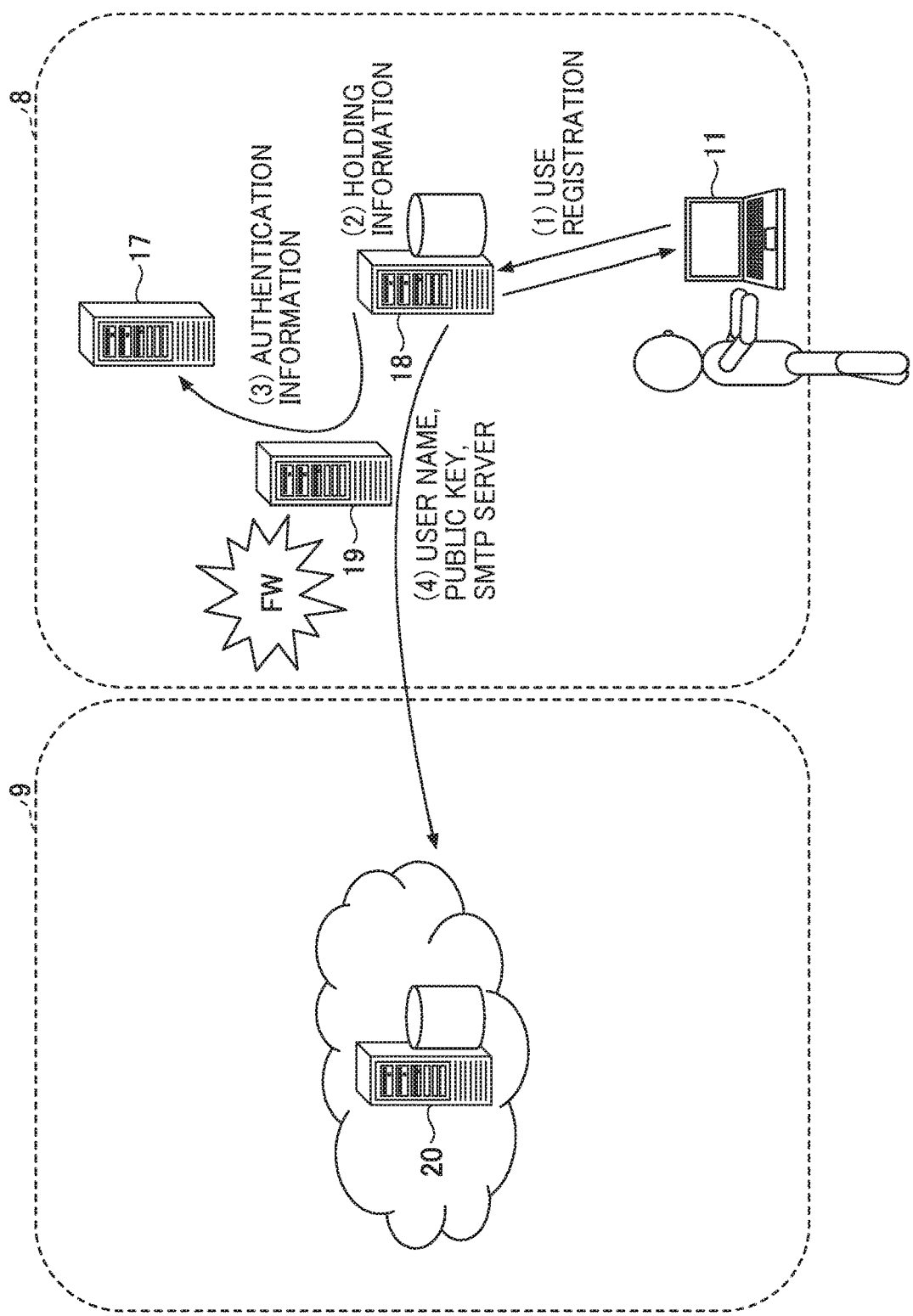
FIG. 18 is a schematic diagram for illustrating use registration performed by the device system of FIG. 17, according to the second embodiment.

FIG. 18 is an example of a diagram for describing use registration of the present embodiment. FIG. 18 illustrates a system configuration partially taken from the system configuration in FIG. 16. In the present embodiment, the public key and the secret key are registered in advance.

(1) First, the user operates the client terminal 11 to perform use registration to the data accumulation server 18. That is, the user inputs the user name, the e-mail address, the login password, and the SMTP server (or address information of the SMTP server). These pieces of information are transmitted to the data accumulation server 18.

(2) The data accumulation server 18 stores the user name, the e-mail address, the address information of the SMTP server, and the e-mail address as the document management information. The remaining information is registered at the registration of the document.

(3) The data accumulation server 18 transmits the user name and the login password to the authentication server 17 via the relay server 19. These pieces of information are registered as the authentication information.

(4) Further, the data accumulation server 18 generates the public key and the secret key paired with each other, and the relay server 19 transmits the user name, the public key, and an SMTP server 13 to the temporary storage server 20. These pieces of information become part of the user information. The data accumulation server 18 registers the secret key to the document management information.

<Processing Flow>

Figure 19:
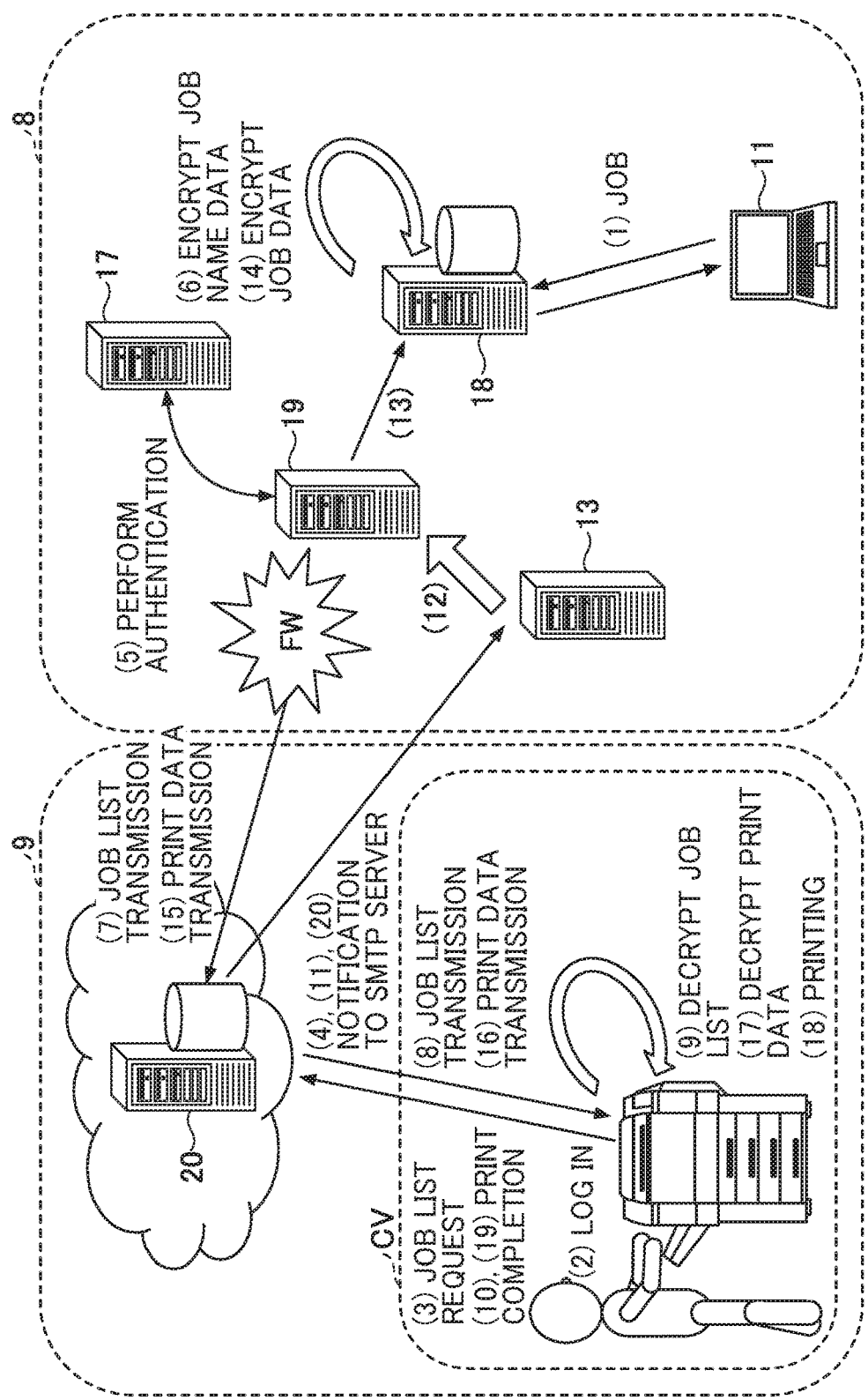
FIG. 19 is a schematic diagram for describing an outline of processing of the device system of FIG. 17, according to the second embodiment.

An overall processing flow of the device system 100 will be described with reference to FIGS. 19 to 20D. FIG. 19 is an example of a diagram for describing an outline of processing of the device system 100.

In the present embodiment, the SMTP server 13 is used. The SMTP server 13 is a server that performs electronic mail transmission processing. The electronic mail transmitted from the outside is transmitted to the SMTP server 13 once. The SMTP server 13 is placed in a demilitarized zone (DMZ). The demilitarized zone is a network different from a company network and is connected via a firewall FW. Communication from a network N3 is permitted for this demilitarized zone, so even if the demilitarized zone is attacked, the company network is safe. An internal SMTP server is installed in the private network 8, and the internal SMTP server appropriately acquires an electronic mail arriving at the SMTP server in the demilitarized zone. The SMTP server 13 and the internal SMTP server are integrally operated. The relay server 19 in the private network 8 can acquire notification from the temporary storage server 20, using this mechanism.

(1) The user operates the client terminal 11, and the client terminal 11 transmits the document to the data accumulation server 18. At this point of time, the job name and the public key are not provided in the present embodiment. Since the user name is specified by login, the user name, the e-mail address, the job name, the job data, and the job status are registered in the document management information.

(2) The user operates the MFP 30 in the convenience store CV to perform login. This login is login to the MFP 30. Next, the user inputs the authentication request information. The authentication requester 29 of the MFP 30 receives the authentication request information.

(3) The authentication requester 29 of the MFP 30 requests the temporary storage server 20 to acquire the authentication request information and a job list. The temporary storage server 20 acquires the authentication request information from the MFP 30 and notifies the authentication request information of the logged-in user to the SMTP server 13 in the demilitarized zone.

(4) Specifically, the user information storage 25 of the temporary storage server 20 transmits the authentication request information to the authentication server 17 in the company via the SMTP server 13 and the relay server 19 to have the authentication request information authenticated. If the authentication fails, the authentication request information is discarded as it is.

(5) The authentication server 17 compares the authentication request information with the authentication information, and determines whether authentication is established.

(6) When the authentication is established, the relay server 19 transmits a job list request to the data accumulation server 18. As illustrated in Table 5, the data accumulation server 18 creates job list information in association with the user name, and encrypts the job list information with the secret key.

TABLE 5

| User name | Temporarily stored job list information | Temporarily stored job information |
| --- | --- | --- |
| mukai | List1 | xxxxx |
| kobayashi | List2 | Dddddd |
| suzuki | List3 | Ccccc |
| kondo | List4 | Mmmmm |

Table 5 illustrates an example of a temporarily stored job list managed by the user information storage 25 of the temporary storage server 20. In the temporarily stored job list, temporarily stored job list information and temporarily stored job information are registered in association with the user name. The temporarily stored job list information is a name and identification information of the job list, and the temporarily stored job information is information in which one or more job names are encrypted.

(7) The data accumulation server 18 transmits the encrypted job list information to the temporary storage server 20 via the relay server 19.

(8) The temporary storage server 20 transmits the job list information and the public key to the MFP 30.

(9) The MFP 30 decrypts the job list information with the public key and displays the job list on the control panel 307.

(10) The user selects the document (job name) and presses a print button. The job name and the like are notified to the temporary storage server 20.

(11) The temporary storage server 20 transmits the job name and the user name to the SMTP server 13.

(12) The relay server 19 detects the notification to the SMTP server 13, accesses the SMTP server 13, and acquires the job name and the user name.

(13) The relay server 19 transmits the job name and user name to the data accumulation server 18.

(14) The data accumulation server 18 encrypts the document with the secret key associated with the user name.

(15) The data accumulation server 18 transmits the encrypted document to the temporary storage server 20 via the relay server 19.

(16) The temporary storage server 20 transmits the document and the public key associated with the user name to the MFP 30.

(17) The MFP 30 decrypts the document with the public key.

(18) The MFP 30 prints the document.

(19) Then, the MFP 30 transmits the notification that the document has been printed (print completion) to the temporary storage server 20.

(20) The data accumulation server 18 detects that the document has been printed via, for example, monitoring (polling) or the SMTP server.

The temporary storage server 20 in the public network 9 can perform notification to the data accumulation server 18 in the private network 8 and can acquire a document via the SMTP server 13.

<Screen Example>

Figure 20B:
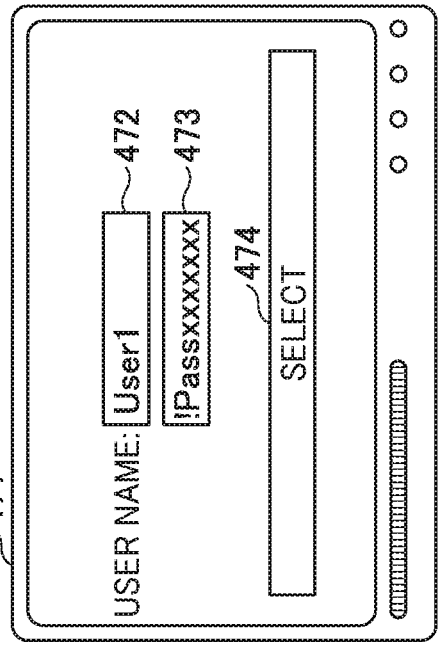
FIGS. 20A to 20D are diagrams illustrating examples of a screen displayed on a control panel of the MFP at the printing of a document, according to the second embodiment.
Figure 20D:
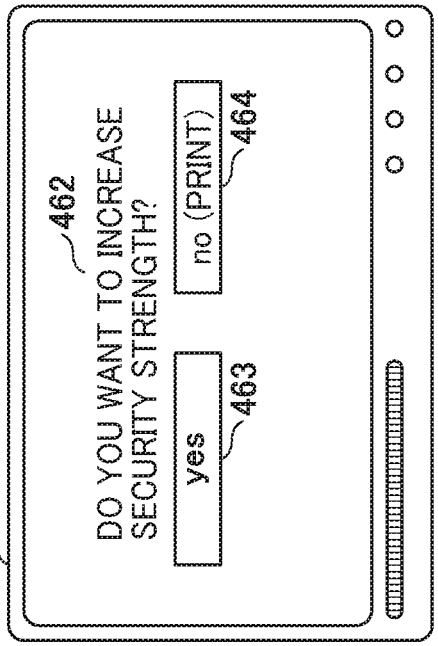
Figure 20A:
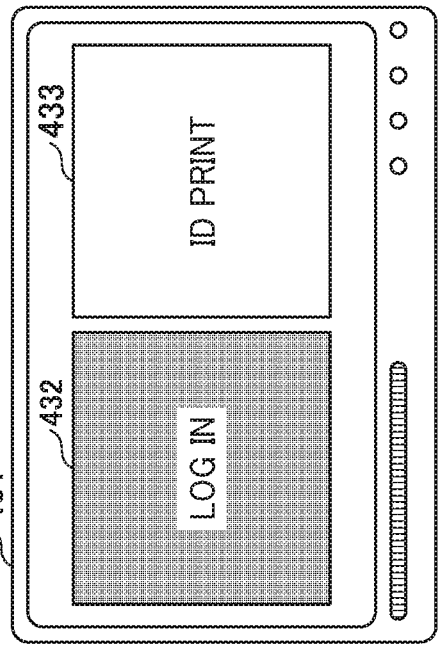
Figure 20C:
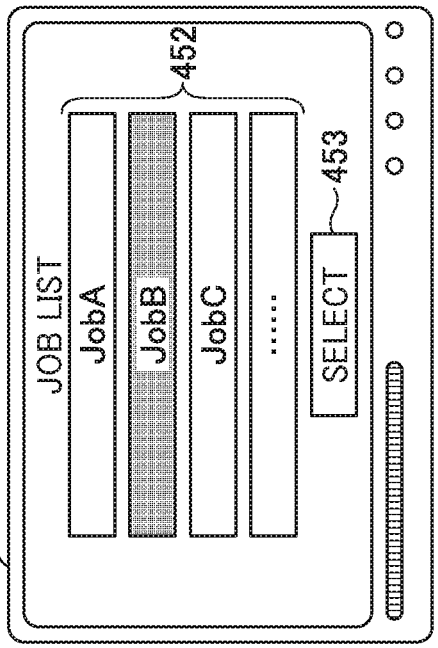

FIGS. 20A to 20D illustrate examples of a screen displayed on the control panel 307 on the MFP 30 at the printing of a document. FIG. 20A is similar to FIG. 12A, FIG. 20B illustrates an example of a login screen 471, FIG. 20C illustrates an example of a job list screen 451, and FIG. 20D illustrates an example of a print start screen 461.

When the login button 432 is pressed in FIG. 20A, the login screen 471 in FIG. 20B is displayed. The login screen 471 includes a user name input field 472, a password input field 473, and a data acquisition button 474. The user inputs his/her user name and login password (inputs the authentication request information) and presses the data acquisition button 474.

As a result, the MFP 30 acquires the job list associated with the user name and displays the job list screen 451 in FIG. 20C. The job list screen 451 displays one or more job names (for example, document names) 452 printable by the user. The user selects one or more job names and presses a selection button 453. As a result, the MFP 30 displays the print start screen 461 in FIG. 20D. The print start screen 461 includes a message 462 of "Do you want to increase security level?", a Yes button 463, and a No button 464. This message 462 will be described in the third embodiment. In FIG. 20D, printing is executed by pressing of the No button 464.

<Operation Procedure>

Figure 21:
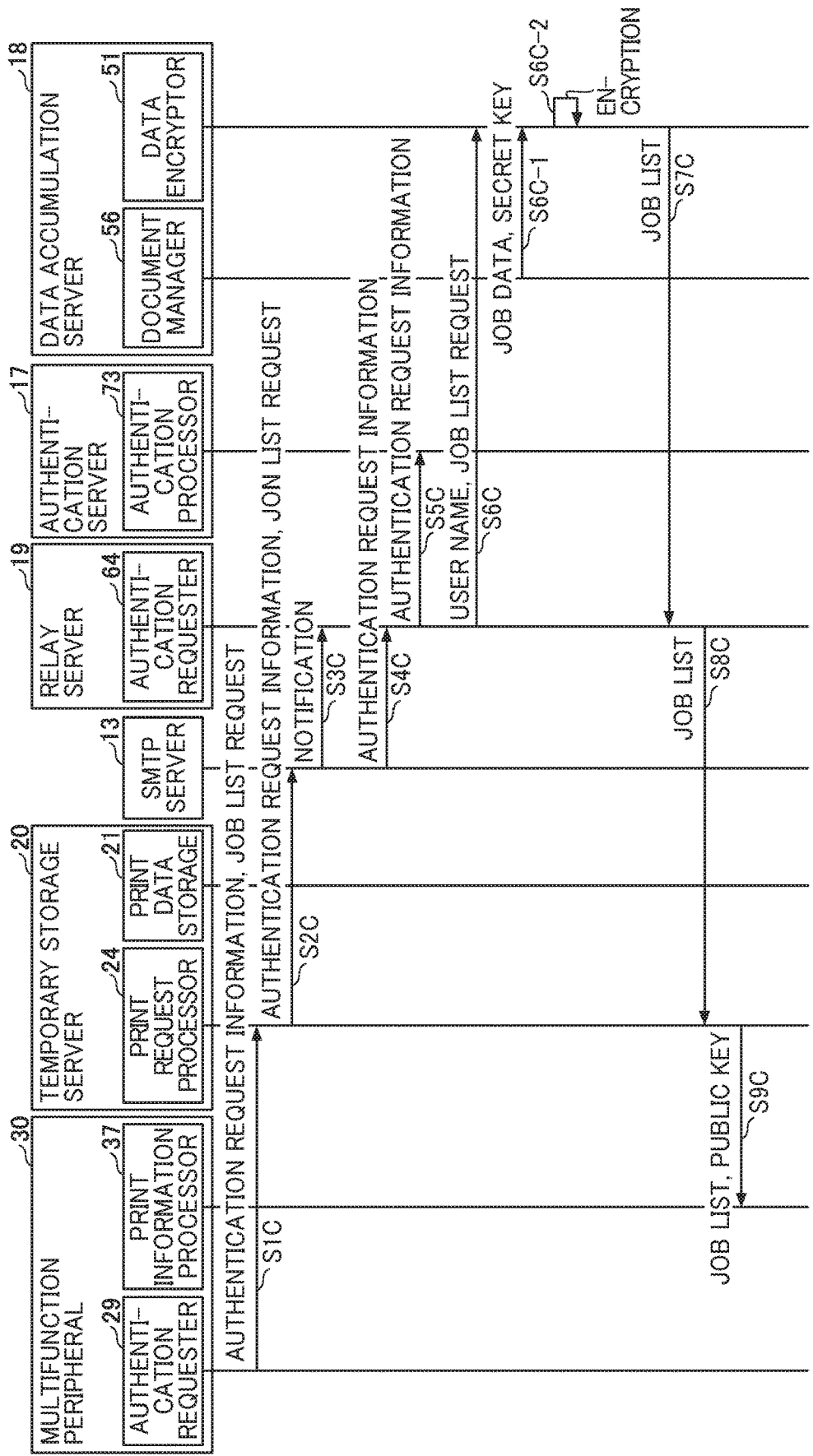
FIG. 21 is a sequence diagram illustrating a procedure in which the MFP acquires a job list from the data accumulation server, according to the second embodiment.

FIG. 21 is an example of a sequence diagram illustrating a procedure in which the MFP 30 acquires a job list from the data accumulation server 18. It is assumed that the document has already been accumulated in the data accumulation server 18.

At S1C, an authentication requester 29 of the MFP 30 receives the authentication request information and transmits the job list request together with the authentication request information to the temporary storage server 20.

At S2C, a print request processor 24 of the temporary storage server 20 acquires the authentication request information and the job list request, refers to the SMTP server 13 of the user information storage 25, and transmits the authentication request information and job list request to the SMTP server 13 associated with the user name.

At S3C, the SMTP server 13 notifies the notification that the authentication request information and the job list request have been acquired to the relay server 19.

At S4C, the authentication requester 64 of the relay server 19 acquires the authentication request information from the SMTP server 13.

At S5C, the authentication requester 64 of the relay server 19 transmits the authentication request information to the authentication server 17. The authentication processor 73 of the authentication server 17 compares the authentication request information with the authentication information and determines whether to authenticate the user. It is assumed here that authentication has been established. The authentication processor 73 returns an authentication result to the relay server 19.

At S6C, the authentication requester 64 of the relay server 19 transmits the job list request together with the user name to the data accumulation server 18.

At S6C-1 and S6C-2, a data encryptor 51 of the data accumulation server 18 acquires the job name and secret key associated with the user name from the document manager 56, and encrypts the job name.

At S7C, a network communicator 54 of the data accumulation server 18 transmits the job list with the encrypted job name to the relay server 19.

At S8C, the network communicator 63 of the relay server 19 transmits the job list to the temporary storage server 20.

At S9C, the print request processor 24 of the temporary storage server 20 transmits the job list and the public key associated with the user name in the user information storage 25 to the MFP 30.

By the above procedure, the MFP 30 can display a job list on the control panel 307 as illustrated in FIG. 20C.

Figure 22:
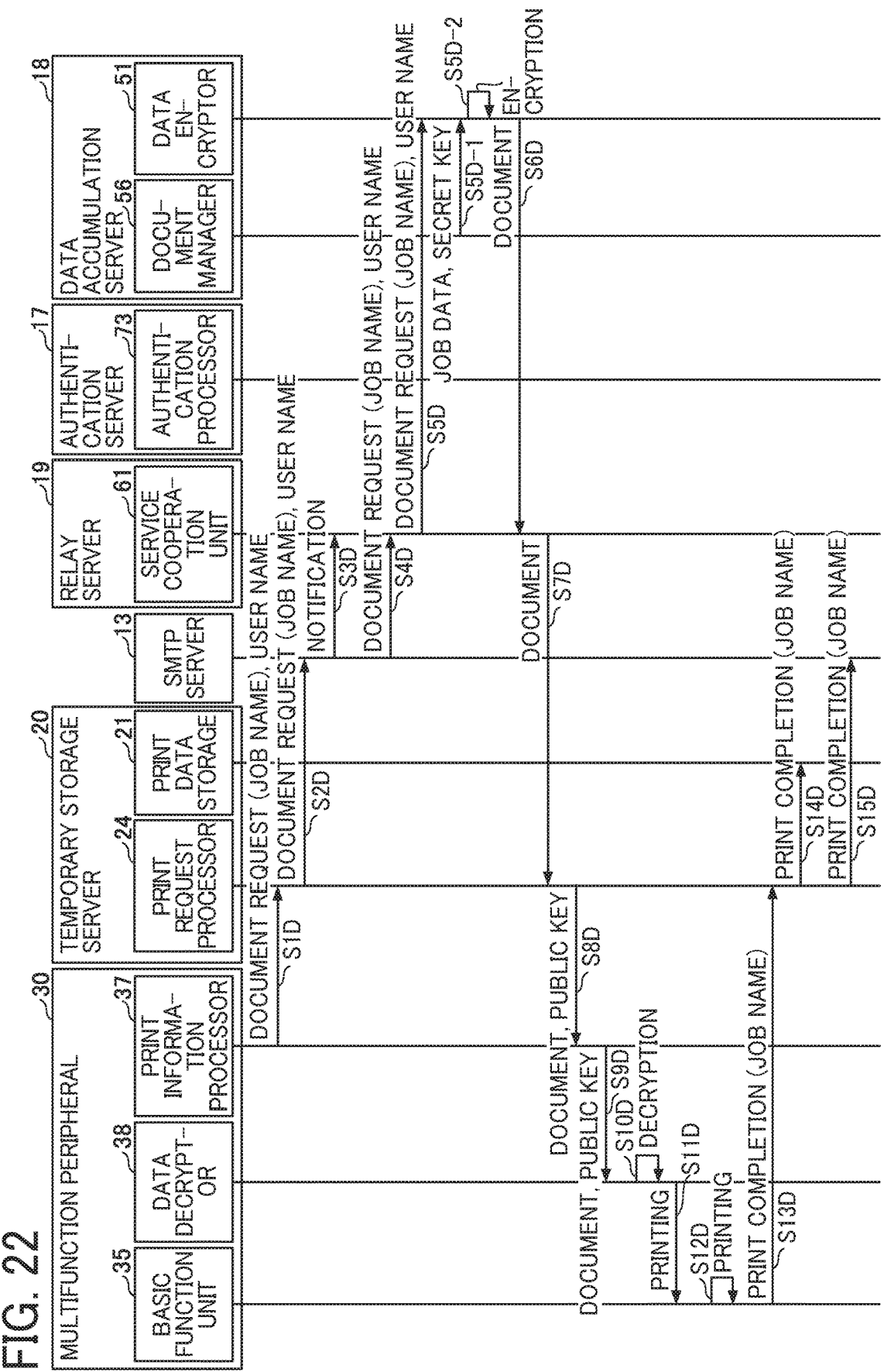
FIG. 22 is a sequence diagram illustrating a procedure in which the MFP acquires a document from the data accumulation server and prints the document, according to the second embodiment.

FIG. 22 is an example of a sequence diagram illustrating a procedure in which the MFP 30 acquires a document from the data accumulation server 18 and prints the document.

At S1D, the print information processor 37 of the MFP 30 receives the document (job name) and transmits a document request together with the user name to the temporary storage server 20.

At S2D, the print request processor 24 of the temporary storage server 20 acquires the user name and the document request, refers to the SMTP server 13 of the user information storage 25, and transmits the user name and the document request to the SMTP server 13 associated with the user name.

At S3D, the SMTP server 13 transmits the notification that the user name and the document request have been acquired to the relay server 19.

At S4D, a service cooperation unit 61 of the relay server 19 acquires the user name and the document request from the SMTP server 13.

At S5D, the service cooperation unit 61 of the relay server 19 transmits the user name and the document request to the data accumulation server 18.

At S5D-1 and S5D-2, a data encryptor 51 of the data accumulation server 18 acquires the job data of the designated job name and the secret key associated with the user name from the document management information, and encrypts job data (document).

At S6D, a network communicator 54 of the data accumulation server 18 transmits the encrypted document to the relay server 19.

At S7D, the network communicator 63 of the relay server 19 transmits the document to the temporary storage server 20.

At S8D, the print request processor 24 of the temporary storage server 20 transmits the document and the public key associated with the user name in the user information storage 25 to the MFP 30.

At S9D and S10D, the print information processor 37 of the MFP 30 sends the document and the public key to the data decryptor 38, and the data decryptor 38 of the MFP 30 decrypts the document with the public key.

At S11D and S12D, the data decryptor 38 of the MFP 30 sends the document to the basic function unit 35, and the basic function unit 35 of the MFP 30 prints the document.

At S13D, when the printing is completed, the basic function unit 35 transmits the information that the printing has been completed together with the job name to the temporary storage server 20 via the network communicator 31.

At S14D, the print request processor 24 of the temporary storage server 20 registers the print data of the document held in the print data storage 21 and printed, and the job status "deleting". The job name (job ID) may be registered instead of the print data.

At S15D, the print request processor 24 of the temporary storage server 20 transmits the notification of print completion to the SMTP server 13.

As described above, the device system 100 of the present embodiment stores the document encrypted with the encryption key in the private network 8, and stores the public key in the public network 9. Since the job list and the document can be requested from the public network 9 to the private network 8 via the SMTP server 13, the user can print the document at a convenience store CV, which have been accumulated in the server at the company.

Furthermore, since the temporary storage server 20 can notify the notification of print completion to the data accumulation server 18 via the SMTP server in addition to monitoring, the history as to whether the document has been printed can be managed even if the same document exists in the private network 8 and in the public network 9. Although polling is inefficient because update is inquired even if there is no update, efficient notification can be implemented by use of the SMTP server.

Third Embodiment

In the third embodiment, a device system 100 in which a user can change security strength (level) will be described. Note that, in the present specification, a constituent element denoted by the same reference numeral serves a similar function. Therefore, description of the constituent element that has been described once may be omitted or only different point may be described. For example, it is assumed that the functional block diagram is similar to that of the second embodiment.

Figure 23:
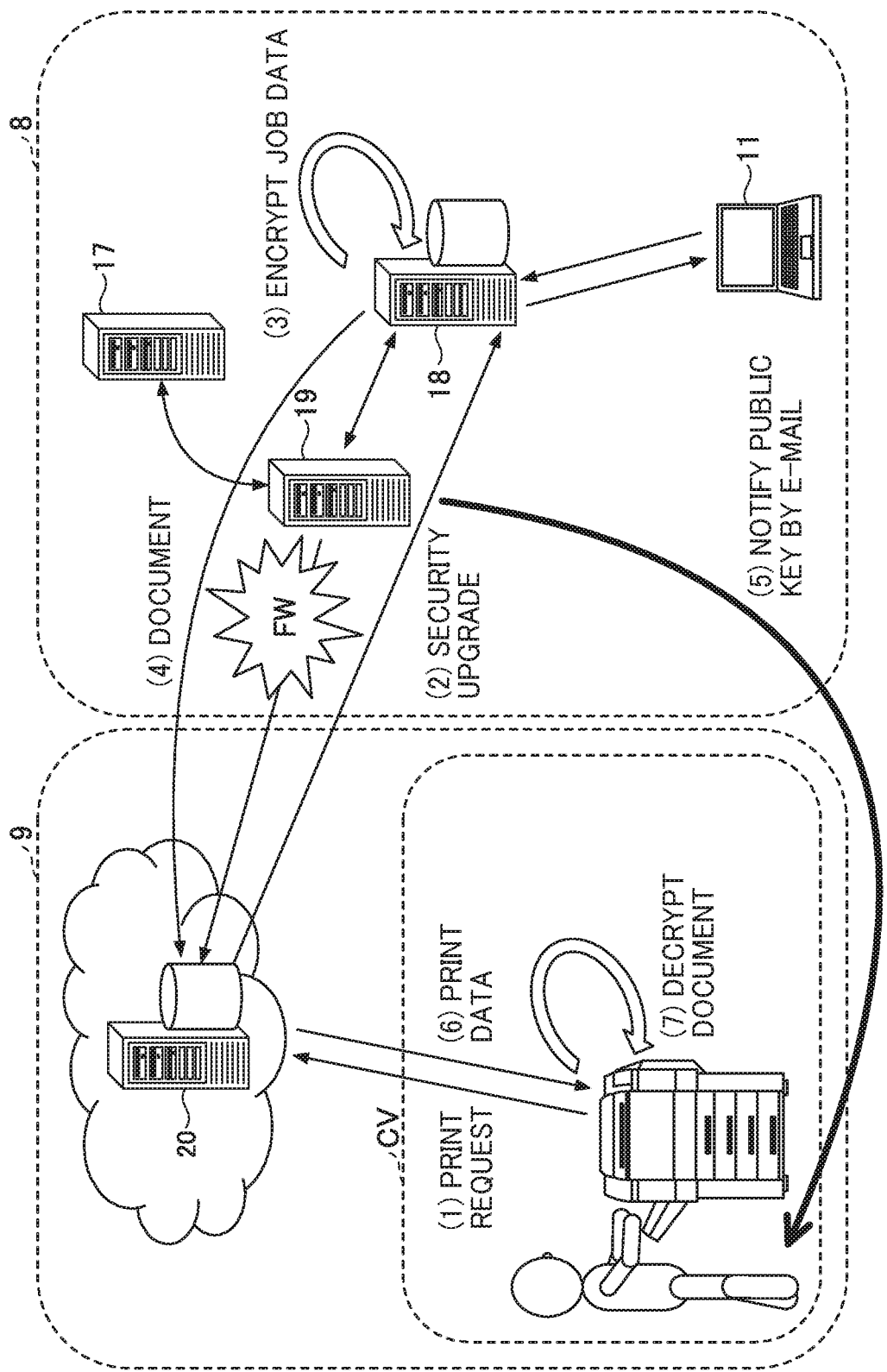
FIG. 23 is an example of a diagram for describing an outline of a device system, according to a third embodiment.

FIG. 23 is an example of a diagram for describing an outline of the device system 100 of the present embodiment.

(1) A user presses a Yes button 463 to a message 462 of "Do you want to increase security strength?" in FIG. 20D. A print information processor 37 of a MFP 30 receives pressing of the Yes button 463.

(2) The MFP 30 notifies security upgrade to a data accumulation server 18 via a temporary storage server 20, an SMTP server 13, and a relay server 19.

(3) With the notification, the data accumulation server 18 encrypts a document, using date and time or the like as an encryption key, instead of a stored secret key. Further, a public key paired with the encryption key is generated.

(4) The data accumulation server 18 transmits the document to the MFP 30 via the relay server 19 and the temporary storage server 20.

(5) The data accumulation server 18 transmits the public key addressed to an e-mail address of the user by an electronic mail.

(6) The temporary storage server 20 transmits the document to the MFP 30.

(7) The MFP 30 decrypts the document encrypted with the encryption key such as the date, with the public key received by the electronic mail.

Therefore, since the secret key and the public key are generated for each document, the security strength can be improved.

<Operation Procedure>

FIG. 24 is an example of a sequence diagram illustrating a procedure in which the MFP 30 acquires a document from the data accumulation server 18 and prints the document. The procedure up to displaying a job list is similar to that in the second embodiment.

At S1E, an authentication requester 29 of the MFP 30 receives the document (job name) and security upgrade, and transmits a document request together with a user name and a security upgrade request to the temporary storage server 20.

At S2E, a print request processor 24 of the temporary storage server 20 acquires the user name, the security upgrade request, and the document request, refers to the SMTP server 13 of a user information storage 25, and transmits the user name, the security upgrade request, and the document request to the SMTP server 13 associated with the user name.

At S3E, the SMTP server 13 notifies the notification that the user name, the security upgrade request, and the document request have been acquired to the relay server 19.

At S4E, a service cooperation unit 61 of the relay server 19 acquires the user name, the security upgrade request, and the document request from the SMTP server 13.

At S5E, the service cooperation unit 61 of the relay server 19 transmits the user name, the security upgrade request, and the document request to the data accumulation server 18.

At S5E-1, a data encryptor 51 of the data accumulation server 18 generates the public key and the secret key, acquires the document of the designated job name from document management information, and encrypts the document.

At S6E, the data encryptor 51 sends the public key and the e-mail address of the user to a public key transmitter 53.

At S7E, a network communicator 54 of the data accumulation server 18 transmits the encrypted document to the relay server 19.

At S8E, a network communicator 63 of the relay server 19 transmits the document to the temporary storage server 20.

At S9E, the print request processor 24 of the temporary storage server 20 transmits the document to the MFP 30.

At S10E, the print information processor 37 of the MFP 30 sends the document to a data decryptor 38.

At S11E, meanwhile, the public key transmitter 53 of the data accumulation server 18 transmits the public key addressed to the e-mail address of the user (client terminal 11).

At S12E, the client terminal 11 displays the public key received by the electronic mail, and the user inputs the public key to the MFP 30. The MFP 30 receives input of the public key.

At S13E, the data decryptor 38 of the MFP 30 decrypts the document with the public key.

At S14E and S15E, the data decryptor 38 of the MFP 30 sends the document to the basic function unit 35, and a basic function unit 35 of the MFP 30 prints the document. Steps S16 to S18 are similar to those in FIG. 22 of the second embodiment.

As described above, since the secret key and the public key are created in real time in addition to the effect of the second embodiment, the device system 100 of the present embodiment can improve the security until the document is transmitted to the MFP 30.

<Other Applications>

Although the best modes for carrying out the present invention have been described by way of embodiments, the present invention is not limited to these embodiments at all, and various modifications and substitutions can be made without departing from the spirit of the present invention.

In the above-described one or more embodiments, the processing of a document to be printed by the MFP 30 has been described as an example. However, any data is applicable similarly to the embodiments as long as the data is created in a company and may be used outside the company. For example, video data (image data) projected by the projector 15 may be similarly used for projection outside the company. In this case, the projector 15 does not need to be at the convenience store CV, and may be used in a presentation at a customer's place, at home, or the like.

In addition, data used in an electronic blackboard, a video conference terminal, a digital signage, or the like may be managed by the device system 100.

In the present embodiment, whether a document has been printed is managed by the document management table and document management information. However, who (user name), where (a user or location information of the MFP 30), when (time information), whether printed, or the like can be managed. Alternatively, even if no printing (output) has been performed, mere access can be managed.

Further, the functions of the temporary storage server 20 may be distributed among a plurality of servers in the public network 9, and the functions of the data accumulation server 18 and the relay server 19 may be distributed among a plurality of servers in the private network 8. Two or more of the data accumulation server 18, the relay server 19, and the authentication server 17 may be integrated in one server.

Further, the document stored by the temporary storage server 20 or the data accumulation server 18 may not be internally stored in the temporary storage server 20 or the data accumulation server 18 as long as the document is stored in a place accessible by the temporary storage server 20 or the data accumulation server 18.

Further, the configuration examples in FIGS. 5 and 17, and the like, described in the above embodiments have been divided according to principal functions in order to facilitate the understanding of the processing of the device system 100. However, the present invention is not limited by the way of division and names of processing units. The device system 100 can also be divided into a larger number of processing units according to the processing contents. Further, one processing unit can be divided to include a larger number of processing.

The print request processor 24 is an example of a processing data processing unit, the print data storage 21 is an example of a management unit, the service cooperation unit 61 is an example of a notification unit, and the document manager 56 is an example of a data management unit. The document management data (first embodiment) included in the temporary storage server 20 is an example of processing data stored in a first processing data storage unit, and the document management data (first embodiment) included in the data accumulation server 18 is an example of processing data stored in a second processing data storage unit. The user information (second embodiment) included in the temporary storage server 20 is an example of processing data stored in the first processing data storage unit, and the document management information (second embodiment) included in the data accumulation server 18 is an example of processing data stored in the second processing data storage unit.

The accumulation server transfer unit 62 is an example of a data transfer unit, the data encryptor 51 is an example of an encryption unit, the print information inputter 36 is an example of an input reception unit, and the data decryptor 38 is an example of a decryption unit, the basic function unit 35 is an example of a processing function unit, the print information processor 37 is an example of a processing unit, the public key transmitter 53 is an example of a key transmission unit, and the print information provider 55 is an example of a providing unit. The data accumulation server 18 is an example of a data accumulation device, the relay server 19 is an example of a relay device, and the temporary storage server 20 is an example of a data storage device. The server in claim 8 is supported by the relay server 19 and the data accumulation server 18, and the server in claim 9 is supported by the temporary storage server 20.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

In one example, the present invention may reside in: a device system including: a data accumulation device and a relay device disposed in a first network; and an electronic device and a data storage device disposed in a second network. The data storage device includes: a processing data processing unit to transmit processing data stored by the data accumulation device to the electronic device, and acquire, from the electronic device, notification notifying that the electronic device has processed the processing data; and a management unit to store information indicating that the electronic device has processed the processing data, in association with the processing data in a first processing data storage unit. The relay device includes a notification unit to acquire, from the data storage device, the information that the processing data has been processed, and notify the information to the data accumulation device. The data accumulation device includes a data management unit configured to record the information that the electronic device has processed the processing data to the processing data stored in a second processing data storage unit in a case where the data accumulation device has acquired, from the relay device, the information that the processing data has been processed.

In one example, in the device system, a firewall is installed in the first network. The relay device communicates with the data storage device via the firewall. The notification unit monitors the data storage device or acquires notification to an information processing apparatus in a demilitarized zone connected to the firewall, to acquire the information that the electronic device has processed the processing data.

In one example, the relay device includes a data transfer unit to transmit the processing data stored in the second processing data storage unit of the data accumulation device to the data storage device at arbitrary timing. The transfer unit starts, after transmitting the processing data to the data storage device, monitoring as to whether the processing data has been processed.

In one example the data accumulation device includes a providing unit that generates key information and provides the key information to a user when the processing data is registered, and an encryption unit that encrypts the processing data. the first processing data storage unit stores the encrypted processing data. The processing data in the second processing data storage unit is encrypted by the encryption unit. The electronic device includes an input reception unit to receive input of the key information for decrypting the processing data, an decryption unit to decrypt the processing data transmitted from the data storage device with the key information, a processing function unit to process the processing data, and a processing unit to transmit the information that the processing data has been processed to the data storage device.

In one example, the notification unit of the relay device acquires, from the data accumulation device, the processing data requested from the data storage device and transmits the processing data to the data storage device. The notification unit further acquires registration to the first processing data storage unit of the information that the processing data transmitted to the data storage device has been processed, or acquires the information that the processing data has been notified to the information processing apparatus in the demilitarized zone connected to the firewall by the data storage device has been processed.

In one example, a simple mail transfer protocol (SMTP) server is disposed in the demilitarized zone. The second processing data storage unit of the data accumulation device stores key information for encrypting the processing data in advance. The first processing data storage unit of the data storage device stores key information for decrypting the processing data, the key information being paired with the key information for encryption, and address information of the SMTP server in advance. The processing data processing unit of the data storage device refers to the address information of the SMTP server and requests the processing data to the SMTP server when a request for the processing data is acquired from the electronic device. The notification unit of the relay device receives notification notifying that the processing data has been requested from the SMTP server, and requests the processing data to the data accumulation device. The notification unit of the relay device acquires the processing data encrypted with the key information for encryption by the data accumulation device, and transmits the encrypted processing data to the data storage device. The processing data processing unit of the data storage device transmits the key information for decrypting the processing data and the processing data to the electronic device. The electronic device includes a decryption unit to decrypt the processing data transmitted from the data storage device with the key information for decryption, a processing function unit to process the processing data, and a processing unit to transmit the information that the processing data has been processed to the data storage device.

In one example, the processing data processing unit of the data storage device refers to the address information of the SMTP server and requests the processing data to the SMTP server when it has acquired a request for the processing data and a security upgrade request from the electronic device. The notification unit of the relay device receives notification of the request for the processing data and the security upgrade request from the SMTP server, and transmits the processing data and the security upgrade request to the data accumulation device. The data accumulation device includes an encryption unit that generates the key information for encryption and the key information for decryption to the security upgrade request, and encrypts the processing data with the key information for encryption. The data accumulation device further includes a key transmission unit that transmits the key information for decryption to an e-mail address held in advance as a destination. The notification unit acquires the processing data encrypted by the data accumulation device and transmits the encrypted processing data to the data storage device. The processing data processing unit of the data storage device transmits the encrypted processing data to the electronic device. The electronic device includes a decryption unit to decrypt the processing data transmitted from the data storage device with the key information for decryption transmitted with the e-mail address, a processing function unit to process the processing data, and a processing unit to transmit the information that the processing data has been processed to the data storage device.

The invention claimed is:

1. A device system comprising:
   a first server that resides on a first network, the first server including first circuitry and a first memory;
   a second server that resides on a second network and communicable with an electronic device, the second server including second circuitry and a second memory,
   wherein the second circuitry of the second server is configured to:
      store processing data, including a print job, transmitted from the first server in the second memory;
      in response to a request for executing the print job by processing the processing data from the electronic device, transmit the processing data to the electronic device; and
      store, in the second memory, information indicating that the processing data has been processed in association with the processing data, in response to reception of a notification indicating that the processing data has been processed from the electronic device,
   wherein the first circuitry of the first server is configured to:
      determine whether the second server stores the information indicating that the processing data has been processed; and
      store the information indicating that the processing data has been processed in the first memory, based on a determination that the second server stores the information indicating that the processing data has been processed.

2. The device system of claim 1,
   wherein the first server includes a data accumulation device and a relay device, the first memory being disposed in the data accumulation device, and
   the relay device monitors whether the information indicating that the processing data has been processed, is registered to the second memory of the second server, to make the determination of whether the second server stores the information indicating that the processing data has been processed.

3. The device system according to claim 1,
   wherein the first server communicates with the second server via a firewall installed in the first network,
   the first server including a data accumulation device, a relay device, and an information processing apparatus, the information processing apparatus being provided in a demilitarized zone connected to the firewall,
   wherein the relay device determines whether a notification indicating that the processing data has been processed is transmitted to the information processing apparatus, to make the determination of whether the second server stores the information indicating that the processing data has been processed.

4. The device system of claim 1, wherein the first circuitry of the first server is configured to:
   transmit the processing data stored in the first memory to the second server to cause the processing data be stored in the second memory; and
   start, after transmitting the processing data, monitoring as to whether the processing data has been processed.

5. The device system of claim 4,
   wherein the first circuitry of the first server is configured to:
      provide key information generated at the first server to a user who has requested registration of the processing data;
      store the processing data encrypted with the key information in the first memory; and
      transmit the processing data encrypted with the key information to the second server for storage in the second memory,
   wherein the electronic device includes third circuitry configured to:
      receive input of the key information for decrypting the processing data from the user who has requested registration of the processing data;
      decrypt the processing data transmitted from the second server with the key information that is input;
      process the processing data that is decrypted; and
      transmit the notification indicating that the processing data has been processed to the second server.

6. The device system of claim 2,
   wherein the relay device acquires, from the data accumulation device, the processing data requested from the second server and transmits the processing data to the second server.

7. The device system according to claim 3,
   wherein the information processing apparatus in the demilitarized zone is a simple mail transfer protocol (SMTP) server,
   wherein the first memory of the data accumulation device stores key information to be used for encrypting the processing data,
   wherein the second server is configured to:
      previously store, in the second memory, key information for decrypting the processing data and address information of the SMTP server in association for the processing data, the key information for decryption being paired with the key information for encryption; and
      in response to the request for processing the processing data from the electronic device, transmit a request for the processing data to the SMTP server using address information of the SMTP server obtained for the processing data,
   wherein the relay device is configured to:
      in response to reception of a notification indicating that the processing data has been requested from the SMTP server, request the data accumulation device for the processing data; and
      transmit the processing data that is encrypted with the key information for encryption by the data accumulation device, to the second server,
   wherein the second server transmits the key information for decryption and the encrypted processing data to the electronic device,
   the system further comprising the electronic device including third circuitry being configured to:

decrypt the encrypted processing data transmitted from the second server with the key information for decryption;

process the processing data that is decrypted; and transmit the notification indicating that the processing data has been processed to the second server.

8. The device system of claim 7, wherein the second server is further configured to receive, in addition to the request for the processing data, a security upgrade request from the electronic device, wherein the relay device is further configured to transmit the security upgrade request to the data accumulation device in response to the reception of the notification indicating that the processing data has been requested from the SMTP server, wherein the data accumulation device is further configured to newly generate a pair of key information for encryption and key information for decryption, encrypt the processing data with the newly-generated key information for encryption to generate the encrypted processing data, and transmit the newly-generated key information for decryption to an e-mail address previously stored as a destination, and wherein the electronic device is configured to decrypt the encrypted processing data transmitted from the second server, with the key information for decryption that is transmitted to the e-mail address.

9. A server residing on a first network, communicably connected with another server residing on a second network, the another server being configured to:

store, in a memory of the another server, processing data, including a print job, transmitted from the server on the first network;

in response, to a request for executing the print job by processing the processing data from an electronic device, transmit the processing data to the electronic device; and store, in the memory of the another server, information indicating that the processing data has been processed in association with the processing data, in response to reception of a notification indicating that the processing data has been processed from the electronic device, the server comprising:

a memory configured to store the processing data to be processed by the electronic device; and circuitry configured to determine whether the another server stores the information indicating that the processing data has been processed, and store the information indicating that the processing data has been processed in the memory based on a determination that the second server stores the information indicating that the processing data has been processed.

10. A server communicably connected with another server that resides on a network different than a network on which the server resides, the server comprising:

a memory configured to store processing data transmitted from the another server; and circuitry configured to:

in response to a request for executing a print job included in the processing data by processing the processing data from an electronic device, transmit the processing data to the electronic device; and store, in the memory, information indicating that the processing data has been processed in association with the processing data, in response to reception of a notification indicating that the processing data has been processed from the electronic device;

the another server being configured to:

determine whether the server stores the information indicating that the print job of the processing data has been processed; and store the information indicating that the processing data has been processed in a memory of the another server, based on a determination that the another server stores the information indicating that the processing data has been processed.

11. A data processing method, performed by a first server residing on a first network and a second server residing on a second network, the method comprising:

with the second server, storing processing data transmitted from the first server in a memory of the second server;

with the second server, transmitting the processing data to an electronic device in response to a request for executing a print job included in the processing data by processing the processing data from the electronic device;

with the second server, storing information indicating that the print job of the processing data has been processed in association with the processing data in the memory of the second server, in response to reception of a notification indicating that the processing data has been processed from the electronic device;

with the first server, determining whether the second server stores the information indicating that the processing data has been processed; and with the first server, storing the information indicating that the processing data has been processed in a memory of the first server, based on a determination that the second server stores the information indicating that the processing data has been processed.

* * * * *